(12) United States Patent
Romanenko et al.

(10) Patent No.: US 11,200,293 B2
(45) Date of Patent: *Dec. 14, 2021

(54) METHOD AND SYSTEM FOR CONTROLLING PRESENTATION OF WEB RESOURCES IN A BROWSER WINDOW

(71) Applicant: YANDEX EUROPE AG, Lucerne (CH)

(72) Inventors: Fedor Sergeevich Romanenko, Moscow (RU); Konstantin Pavlovitch Gorskiy, Moscow (RU); Gennadii Vladimirovich Lokhtin, Irkutsk (RU); Mikhail Gennadievich Milnikov, Chernogolovka (RU); Konstantin Nikolaevich Ivanov, Moscow (RU)

(73) Assignee: YANDEX EUROPE AG, Lucerne (CH)

( * ) Notice: Subject to any disclaimer, the term of this patent is extended or adjusted under 35 U.S.C. 154(b) by 50 days.

This patent is subject to a terminal disclaimer.

(21) Appl. No.: 16/402,005

(22) Filed: May 2, 2019

(65) Prior Publication Data

US 2019/0258691 A1 Aug. 22, 2019

Related U.S. Application Data

(63) Continuation of application No. 15/515,633, filed as application No. PCT/IB2015/057795 on Oct. 12, 2015, now Pat. No. 10,324,998.

(30) Foreign Application Priority Data

Mar. 31, 2015 (RU) .................................. 2015111632

(51) Int. Cl.
*G06F 16/957* (2019.01)
*G06F 3/048* (2013.01)
(Continued)

(52) U.S. Cl.
CPC .......... *G06F 16/9577* (2019.01); *G06F 3/048* (2013.01); *G06F 3/0481* (2013.01);
(Continued)

(58) Field of Classification Search
CPC .... G06F 16/951; G06F 16/9577; G06F 3/048; G06F 3/0481; G06F 3/0482;
(Continued)

(56) References Cited

U.S. PATENT DOCUMENTS 7,673,233 B2  3/2010  Moore et al.
7,881,984 B2  2/2011  Kane et al.
(Continued)

FOREIGN PATENT DOCUMENTS

CN  102929997 A  2/2013
RU  2500026 C2  11/2013
(Continued)

OTHER PUBLICATIONS

Office Action received in the U.S. counterpart U.S. Appl. No. 15/688,357 dated Sep. 5, 2019.
(Continued)

*Primary Examiner* — Tan H Tran
(74) *Attorney, Agent, or Firm* — BCF LLP

(57) ABSTRACT

A method of stacking tabs in a tab panel is provided. The method comprises, in a first tab associated with a first resource, receiving a request for opening a second resource; identifying whether a type of the first resource is a hub type; responsive to the type not being the hub type, identifying the type as a node type; based on the identified type, controlling presentation of the second resource by a selective execution of: (i) responsive to the first resource being of the node type, opening the second resource in the first tab; and (ii) responsive to the first resource being of the hub type, creating a second tab; opening the second resource in that tab; and
(Continued)

stacking the second tab on the first tab. The first tab is stacked under the second tab. The first and second tabs are visually organized in a tab stack.

18 Claims, 13 Drawing Sheets

(51) Int. Cl.
- *G06F 3/0481* (2013.01)
- *G06F 3/0482* (2013.01)
- *G06F 3/0484* (2013.01)
- *G06F 16/951* (2019.01)
- *G06F 3/0483* (2013.01)
- *G06F 3/0486* (2013.01)

(52) U.S. Cl.
CPC .......... *G06F 3/0482* (2013.01); *G06F 3/0483* (2013.01); *G06F 3/0486* (2013.01); *G06F 3/04842* (2013.01); *G06F 16/951* (2019.01); *G06F 16/957* (2019.01)

(58) Field of Classification Search
CPC .... G06F 3/0483; G06F 3/0486; G06F 16/957; G06F 3/04842; G06F 16/95
See application file for complete search history.

(56) References Cited

U.S. PATENT DOCUMENTS

| | | | |
|---|---|---|---|
| 8,271,878 | B2 | 9/2012 | Kane et al. |
| 8,584,233 | B1 | 11/2013 | Yang et al. |
| 8,819,560 | B2 | 8/2014 | Ortwein et al. |
| 8,881,032 | B1 | 11/2014 | Weber et al. |
| 2003/0212760 | A1 | 11/2003 | Chen et al. |
| 2006/0230356 | A1 | 10/2006 | Sauve |
| 2007/0067733 | A1* | 3/2007 | Moore ................. G06F 16/957 |
| 2008/0040682 | A1 | 2/2008 | Sorenson |
| 2008/0320075 | A1 | 12/2008 | Livshits et al. |
| 2009/0077123 | A1 | 3/2009 | Gibson |
| 2009/0240685 | A1 | 9/2009 | Costello et al. |
| 2009/0327913 | A1 | 12/2009 | Adar et al. |
| 2009/0327947 | A1* | 12/2009 | Schreiner ............. G06F 3/0483 |
| | | | 715/777 |
| 2010/0250513 | A1 | 9/2010 | Guha |
| 2011/0054999 | A1 | 3/2011 | Attenberg et al. |
| 2011/0225506 | A1* | 9/2011 | Casalaina ............ G06Q 30/016 |
| | | | 715/741 |
| 2011/0271224 | A1* | 11/2011 | Cruz Moreno ....... G06F 3/0483 |
| | | | 715/777 |
| 2012/0054166 | A1 | 3/2012 | Jeremias |
| 2012/0137201 | A1 | 5/2012 | White et al. |
| 2012/0158724 | A1 | 6/2012 | Mahadevan et al. |
| 2012/0254150 | A1 | 10/2012 | Gupta et al. |
| 2012/0311139 | A1 | 12/2012 | Brave et al. |
| 2013/0073509 | A1 | 3/2013 | Burkard et al. |
| 2013/0198030 | A1 | 8/2013 | Linden et al. |
| 2013/0198243 | A1 | 8/2013 | Givens |
| 2013/0325832 | A1* | 12/2013 | French ................ G06F 16/9577 |
| | | | 707/706 |
| 2014/0164960 | A1* | 6/2014 | Kuo ...................... G06F 3/0486 |
| | | | 715/760 |
| 2014/0196144 | A1 | 7/2014 | Trost |
| 2014/0237414 | A1 | 8/2014 | Law et al. |
| 2014/0337780 | A1 | 11/2014 | Northrup |
| 2014/0365854 | A1 | 12/2014 | Karunamuni et al. |
| 2015/0213148 | A1 | 7/2015 | Blemaster |
| 2016/0139750 | A1* | 5/2016 | Barrus .................. G06F 3/0483 |
| | | | 715/777 |

FOREIGN PATENT DOCUMENTS

| | | |
|---|---|---|
| WO | 2009117273 A2 | 9/2009 |
| WO | 2012055104 A1 | 5/2012 |
| WO | 2012164316 A1 | 12/2012 |

OTHER PUBLICATIONS

International Search Report with regard to PCT/IB2015/057795 dated Jan. 29, 2016.
English abstract of CN102929997 retrieved from Espacenet on Mar. 18, 2016.
Mukhopadhyay et al., "A Syntactic Classification based Web Page Ranking Algorithm", MSPT 2016, 6th International Workshop on MSPT Proceedings, pp. 83-92.
Qi et al., "Feature and Algorithms", Department of Computer Science & Engineering, Lehigh University, Jun. 2007, Web Page Classification, Presentation, pp. 1-95.
International Preliminary Report on Patentability with regard to PCT/IB2015/057795 dated Dec. 28, 2016.
Office Action received in the U.S. counterpart U.S. Appl. No. 15/688,357 dated Oct. 24, 2019.

* cited by examiner

METHOD AND SYSTEM FOR CONTROLLING PRESENTATION OF WEB RESOURCES IN A BROWSER WINDOW

CROSS-REFERENCE

The present application is a continuation of U.S. patent application Ser. No. 15/515,633, filed Mar. 30, 2017, entitled "METHOD AND SYSTEM FOR CONTROLLING PRESENTATION OF WEB RESOURCES IN A BROWSER WINDOW," which is a national stage entry of International Patent Application No. PCT/IB2015/057795, filed on Oct. 12, 2015, entitled "METHOD AND SYSTEM FOR CONTROLLING PRESENTATION OF WEB RESOURCES IN A BROWSER WINDOW", which claims priority to Russian Patent Application No. 2015111632, filed Mar. 31, 2015, entitled "METHOD AND SYSTEM FOR CONTROLLING PRESENTATION OF WEB RESOURCES IN A BROWSER WINDOW," the entirety of all of which is incorporated herein.

FIELD

The present technology relates to presentation of information in a browser window.

BACKGROUND

A browser application such as Mozilla Firefox™, Google Chrome™, Yandex™, and the like can be used to access information via various kinds of global or local communications networks (the Internet, the World Wide Web, local area networks and the like). The available information includes a variety of content types, such as photos, video, audio and the like, and relates to a wide range of topics, such as but not limited to news, weather, traffic, entertainment, finance and the like. The information is accessed using a wide range of electronic devices such as desktop computers, laptop computers, smartphones, tablets and the like.

FIG. 13 shows a typical browser window 1104 generated in a known browser application 1102, Mozilla Firefox™ in the illustrated example. The browser window 1104 has a command interface 1106 and a content display space 1108. The browser window 1104 also includes a command menu panel 1112 including several command buttons such as "FILE", "EDIT" "VIEW", "HISTORY", "BOOKMARKS", "TOOLS", "HELP", and the like. The browser window 1104 includes a window control panel 1111 having buttons for maximizing, minimizing and closing the browser window 1104. A navigation control panel 1114 includes a back button 1116, a forward button 1118, a refresh button 1120, stop loading button 1122, and a home button 1124.

The content of a web resource being currently accessed by the browser application 1102 is displayed in the content display space 1108 while the command interface 1106 displays the address of the accessed web resource. A user can navigate to a different web resource either by typing the address (Universal Resource Locator or URL) of the desired web resource in the command interface 1106, by selecting a previously stored bookmark, or by clicking on a hyperlink included in the content displayed in the content display space 1108.

A user typically likes to maintain access to multiple web resources (web pages) simultaneously. Tabbed browsing is provided in most browser applications to facilitate multiple web pages being open simultaneously, and to allow a user to switch between viewing any one of the multiple open web pages.

A tab panel 1130 includes a new tab button 1132 and several tabs 1136. Each tab 1136 is associated with a corresponding web resource. Each tab 1136 has a cross at the right end thereof which can be clicked on to close the tab 1136, and the web resource associated therewith. The new tab button 1132 can be clicked to open a new tab, which is typically placed on a right side of the rightmost tab 1136 in the tab panel 1130. When a user clicks on any one of the tabs 1136, the tab become activated, i.e. the tab 1136 become a currently activated tab 1138 and the content display space 1108 displays the content of the display space 1140 associated with the currently activated tab 1138.

The user can choose to have a desired web resource be displayed in the display space 1140 associated with the currently activated tab 1138 (either by entering the address in the command interface 1106, or by clicking on a hyperlink shown in the display space 1140). Alternately, the user could right-click on a hyperlink in the display space 1104 of the currently activated tab 1138 to open a desired web resource corresponding to the selected hyperlink in a new tab. When a new tab 1136 is opened in this manner by clicking on a hyperlink from a current tab 1138, the new tab 1136 could be inserted on a right side of the currently activated tab 1138 and not at the right most end of the tab block 1134. The sequence of tabs 1136 in the tab panel 1130 thus depends on the particular sequence of events which led to the opening of the corresponding web resources.

While it may be convenient and desirable to access multiple web resources simultaneously, a user attempting to obtain information from various web resources would also find the browsing experience to be confusing, annoying, or at the very least inconvenient, due to the proliferation of tabs 1136 and random organization thereof in the tab panel 1130. In addition, having multiple web pages open simultaneously also creates a burden on computing resources such as the processor, memory, communication bandwidth.

SUMMARY

It is an object of the present technology to ameliorate at least some of the inconveniences present in the prior art.

Embodiments of the present technology have been developed based on inventors' appreciating that there exists at least one problem or an area for improvement associated with the prior art solutions.

According to a first broad aspect of the present technology, there is provided a method of stacking tabs in a tab panel of a browser window. The tab panel facilitates multiple web pages being open simultaneously in the browser and allowing a user to switch between viewing any one of the multiple web pages. The method is executable by an electronic device comprises: in a first tab associated with a first web resource, receiving a user request for opening a second web resource. The method also comprises identifying whether a web resource type of the first web resource is of a hub type. The hub type corresponds to a web resource serving as a routing page for navigating to other web resources. The method also comprises, responsive to the web resource type of the first web resource not being of the hub type, identifying the web resource type of the first web resource type as being of a node type. The method also comprises, responsive to the first web resource being of the node type, opening the second web resource in the first tab in lieu of the first web resource. The method also comprises, responsive to the first web resource being of the hub type, (i) creating a second tab; (ii) opening the second web resource in the second tab; and (iii) stacking the second tab on the first tab. The first tab is thereby stacked under the second tab. The first tab and the second tab are comprised in a tab stack of the browser window. The tab stack comprises a plurality of stacked tabs. The method also comprises, responsive to receiving a user request for activating a subject tab of the tab stack: (i) activating the subject tab; and (ii) closing each tab of the tab stack being stacked on the subject tab without closing the subject tab.

In some embodiments of the method, the method further comprises, responsive to receiving a user request for a back operation from a subject web resource associated with the subject tab of the tab stack, (i) closing each tab of the tab stack being stacked one of on and above the subject tab responsive to the subject web resource being of the hub type; (ii) accessing a browser history for the subject tab; (iii) responsive to the browser history including a previously accessed web resource, opening the previously accessed web resource in the subject tab; and (iv) responsive to the browser history being indicative of the subject web resource being an earliest accessed web resource, closing the subject tab.

In some embodiments of the method, the method further comprises providing a first back operation element selectable by the user for requesting a first back operation; and providing a second back operation element selectable by the user for requesting a second back operation. The method also comprises, responsive to receiving a user request for the first back operation, executing a first back operation routine comprising: (i) responsive to the subject web resource being of the hub type, closing each tab of the tab stack being stacked on the subject tab; (ii) accessing a browser history for the subject tab; (iii) responsive to the browser history including a previously accessed web resource, opening the previously accessed web resource in the subject tab; and (iv) responsive to the browser history being indicative of the subject web resource being an earliest accessed web resource, closing the subject tab. The method also comprises, responsive to receiving a user request for the second back operation, executing a second back operation routine comprising: (i) closing the subject tab; (ii) responsive to the subject web resource being of the hub type, closing each tab of the tab stack being stacked on the subject tab; and (iii) activating a third tab of the tab stack other than the subject tab, the third tab being stacked under the subject tab.

In some embodiments of the method, the browser window comprises a second tab stack. The second tab stack comprises a second plurality of stacked tabs. The method further comprises receiving a user request to move a second subject tab from the second tab stack. The method also comprises, responsive to receiving the user request to move the second subject tab from the second tab stack, (i) moving the second subject tab from the second tab stack; and (ii) placing the second subject tab in a new tab group, the new tab group excluding the second tab stack.

In some embodiments of the method, the method further comprises moving to the new tab group, each tab of the second tab stack which was stacked one of on and above the second subject tab prior to moving the second subject tab from the second tab stack.

In some embodiments of the method, the second tab stack from which the second subject tab is moved is an original tab stack. The new tab group is a new tab stack comprising the second subject tab and each tab of the original tab stack which was stacked one of on and above the second subject tab prior to moving the second subject tab from the original tab stack.

In some embodiments of the method, the method further comprises providing a move tab element associated with each tab of the second plurality of stacked tabs of the second tab stack. The move tab element is selectable by the user to request moving of the corresponding stacked tab from the second tab stack.

In some embodiments of the method, the first web resource is a search engine results page (SERP). The second web resource is a search engine result included in the SERP. The SERP is of the hub type and the search engine result is one of the hub type and the node type.

In some embodiments of the method, the browser window comprises a second tab stack. The second tab stack comprises a second plurality of stacked tabs. The method further comprises, in a second subject tab of the second tab stack associated with a second subject web resource, receiving a user request for opening a target web resource. The method also comprises identifying the web resource type of the second subject web resource. The web resource type is one of the hub type and the node type. The method also comprises, responsive to the second subject web resource being of the node type, opening the target web resource in the second subject tab in lieu of the second subject web resource. The method also comprises, responsive to the second subject web resource being of the hub type, opening the target web resource in a target tab of the second tab stack stacked on the second subject tab.

In some embodiments of the method, the method further comprises, responsive to the second subject tab being a topmost tab of the second tab stack: (i) creating the target tab in the second tab stack of the browser window; and (ii) stacking the target tab on the second subject tab, the second subject tab being thereby stacked under the target tab.

In some embodiments of the method, the method further comprises providing a new tab modifier element selectable by a user. The method also comprises, responsive to the new tab modifier element being selected when receiving the user request for opening the target web resource, opening the target web resource in a new tab regardless of the web resource type of the second subject web resource. The new tab is in a new tab group excluding the second subject tab and the second tab stack excluding the new tab.

In some embodiments of the method, the method further comprises, responsive to obtaining a new tab tag with the target web resource, opening the target web resource in a new tab regardless of the web resource type of the second subject web resource. The new tab tag is provided with the target web resource to have the target web resource be opened in the new tab. The new tab is in a new tab group excluding the second subject tab and the second tab stack excluding the new tab.

In some embodiments of the method, the method further comprises assigning the web resource type to the first web resource.

In some embodiments of the method, the web resource type is assigned based at least in part on at least one of: (i) a general user browsing pattern for the first web resource; (ii) a local user browsing pattern associated with the electronic device; (iii) a pre-defined rule associated with the first web resource; and (iv) a number of outgoing links from the first web resource.

In the context of the present specification, a "server" is a computer program that is running on appropriate hardware and is capable of receiving requests (e.g. from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, a "web resource" is any data or collection of data that can be provided by a publisher over a network and that is associated with a web resource address. Non-limiting examples of web resources include HTML pages, documents, images, video, feed sources, as well as pluralities of files such as the foregoing. Web resources may include content, such as words, phrases, pictures, and so on, and/or embedded information such as metadata, hyperlinks and/or embedded instructions (such as JavaScript scripts).

In the context of the present specification, "client device" or "electronic device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first tab" and "third tab" is not intended to imply any particular order, type, chronology, hierarchy or ranking (for example) of/between the tabs, nor is their use (by itself) intended imply that any "second tab" must necessarily exist in any given situation. Further, as is discussed herein in other contexts, reference to a "first" element and a "second" element does not preclude the two elements from being the same actual real-world element. Thus, for example, in some instances, a "first" tab and a "second" tab may be the same tab, in other cases they may be different tabs.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
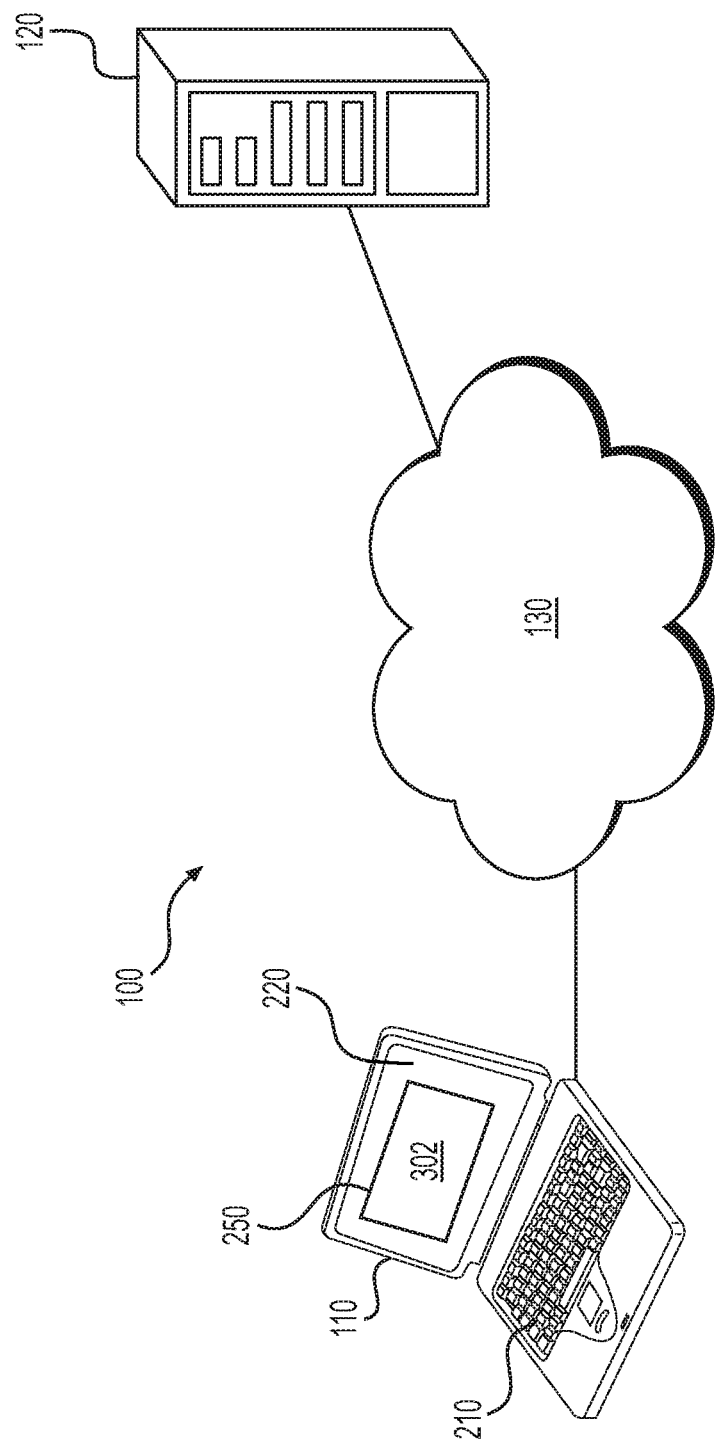
FIG. 1 is a schematic illustration of a system in accordance with non-limiting embodiments of the present technology.

With reference to FIG. 1, there is shown a schematic diagram of a system suitable for use with some implementations of the present technology. It should be understood that the system 100 is shown herein merely as an illustrative implementation of the present technology. Thus, the description of the system 100 that follows is intended to be only a description of illustrative examples of the present technology. This description is not intended to define the scope or set forth the bounds of the present technology.

In some cases, what are believed to be helpful examples of modifications to the system 100 may also be set forth below. The modifications are described merely as an aid to understanding, and again, not to define the scope or set forth the bounds of the present technology. These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition it is to be understood that the system 100 may provide in certain instances simple implementations of the present technology, and that where such is the case they have been presented in this manner as an aid to understanding. As persons skilled in the art would understand, various implementations of the present technology may be of a greater complexity.

The system 100 includes an electronic device 110, a server 120 and a communication network 130. The electronic device 110 communicates with the server 120 via the communications network 130. Although the present description is made with reference to the system 100 having one electronic device 110 and one server 120, it should be understood that the system 100 could include more than one electronic device 110 and more than one server 120.

The electronic device 110 is typically associated with a user (not depicted) and, as such, can sometimes be referred to as a "client device". In the illustrated embodiment, the electronic device 110 is a laptop computer. The implementation of the electronic device 110 is however not limited to a laptop computer 110. As an example, the electronic device 110 may be implemented as smartphone, a personal computer (desktops, laptops, netbooks, etc.), a wireless electronic device (a cell phone, a smartphone, a tablet and the like), as well as network equipment (a router, a switch, or a gateway). The general implementation of the electronic device 110 is known in the art and, as such, will not be described here at much length.

Figure 2:
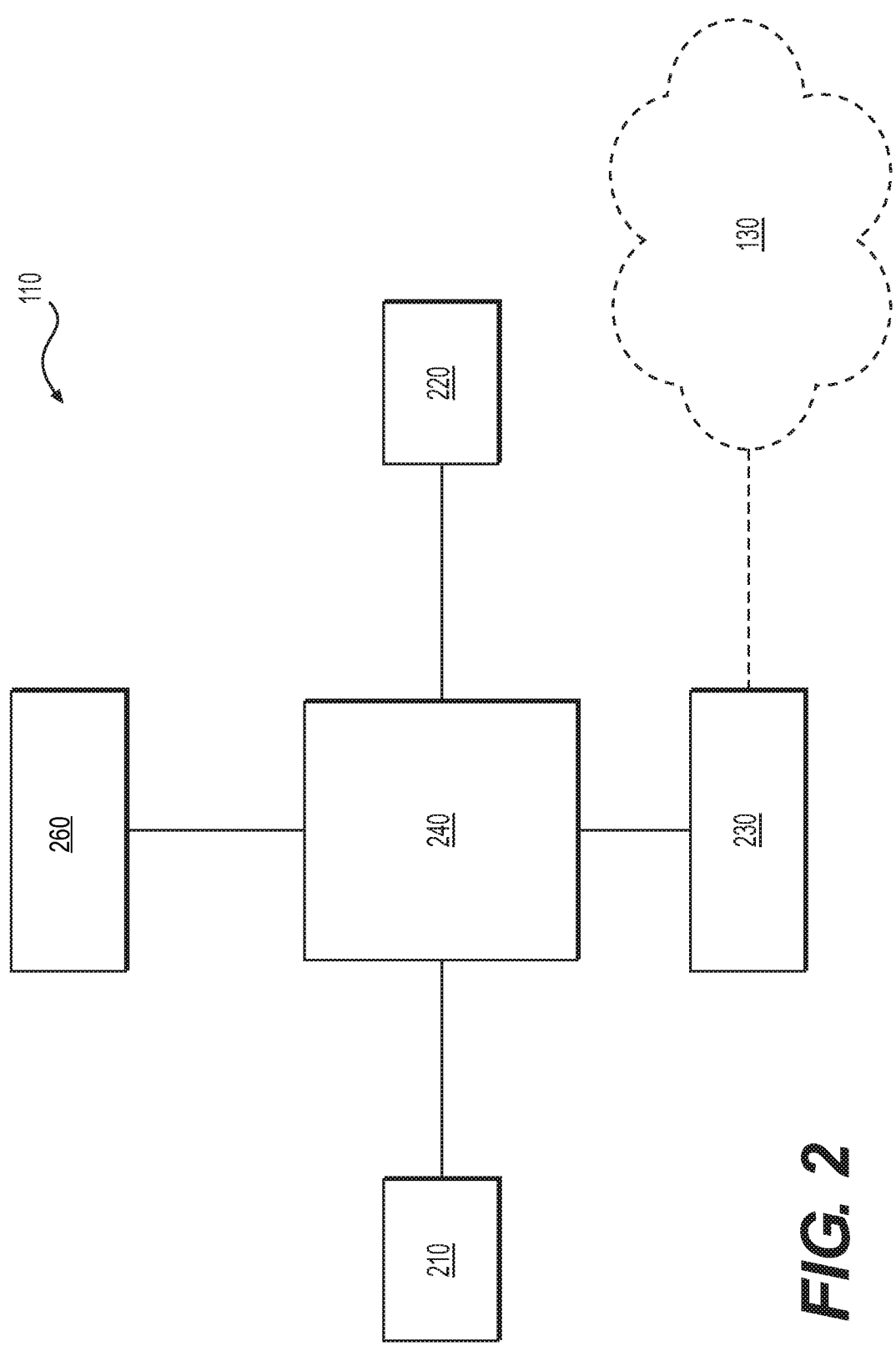
FIG. 2 is a schematic block diagram of an electronic device of the system of FIG. 1.

With reference to FIG. 2, the electronic device 110 includes a user input device 210 (such as a keyboard, a mouse, a touch pad, a touch screen, microphone, and the like) for receiving user inputs. The electronic device 110 includes a user output device 220 (such as a screen, a speaker, a printer and the like) for providing visual, auditory or tactile outputs to the user. The electronic device 110 includes a network communication interface 230 (such as a modem, a network card and the like) for two-way communication over the communications network 130. The electronic device 110 also includes a processor 240 coupled to the user input device 210, the user output device 220 and the network communication interface 230. The processor 240 is configured to execute various methods, including those described herein below. To that end the processor 240 has a memory 260 (in the form of Random Access Memory (RAM), flash memory, or the like), or is communicatively coupled to the memory 260 that stores computer readable commands which, when executed, cause the processor 240 to execute the various methods described herein. The electronic device 110 comprises hardware and/or software and/or firmware, as is known in the art, to execute various applications.

A browser application 250 (FIG. 1) is provided on the electronic device 110 to enable a user (not shown) of the electronic device 110 to access one or more web resources 340 (FIG. 3) via the communication network 130. The electronic device 110 also has other applications such as a word processing application, a video viewing application, a music streaming application, a photo sharing application, and the like, some of which may be configured to receive and transmit information via the communication network 130.

With reference again to FIG. 1, in the illustrated implementation of the present technology, the communication network 130 is the Internet. In other implementations of the present technology, the communications network 130 can be other than the Internet, such as a wide-area communications network, a local-area communications network, a private communications network and the like. In the communication network 130, communication occurs over various types of communication links such as wireless links (such as the Wireless Fidelity, or WiFi® for short, Bluetooth® or the like) or wired links (such as a Universal Serial Bus or USB-based connection or Ethernet based connection, for example).

Also coupled to the communications network 130 is a server 120. The server 120 is connected to the electronic device 110 via the communication network 130. The server 120 is sometimes referred to herein as "remote server" 120 as it is disposed separated from the electronic device 110 and connected thereto via the communication network 130. The server 120 could be connected a plurality of electronic devices 110. The server 120 could also be connected to other servers 120, such as but not limited to network resource servers, application servers, network configuration servers, via the communication network 130.

The server 120 can be implemented as a conventional computer server. In an example of an embodiment of the present technology, the server 120 can be implemented as a Dell™ PowerEdge™ Server running the Microsoft™ Windows Server™ operating system. The server 120 could also be implemented as other kinds of network equipment such as, but not limited to, a router, a switch, or a gateway, a base station and the like. The server 120 can be implemented in any suitable hardware and/or software and/or firmware, or a combination thereof. In the depicted non-limiting embodiment of present technology, the server 120 is a single server. In alternative non-limiting embodiments of the present technology, the functionality of the server 120 may be distributed and may be implemented via multiple servers. The implementation of the server 120 is well known. However, briefly speaking, the server 120 comprises a network communication interface similar to the network communication interface 230 of the electronic device 110 structured and configured to communicate with the electronic device 110 and other devices coupled to the communications network 130. The server 120 further comprises at least one computer processor similar to the processor 240 of the electronic device 110 operationally connected with a memory similar to the memory 260 of the electronic device 110 and the network communication interface 230. The processor 240 of the server 120 is structured and configured to execute various methods to be described herein.

Browser Window

Figure 3:
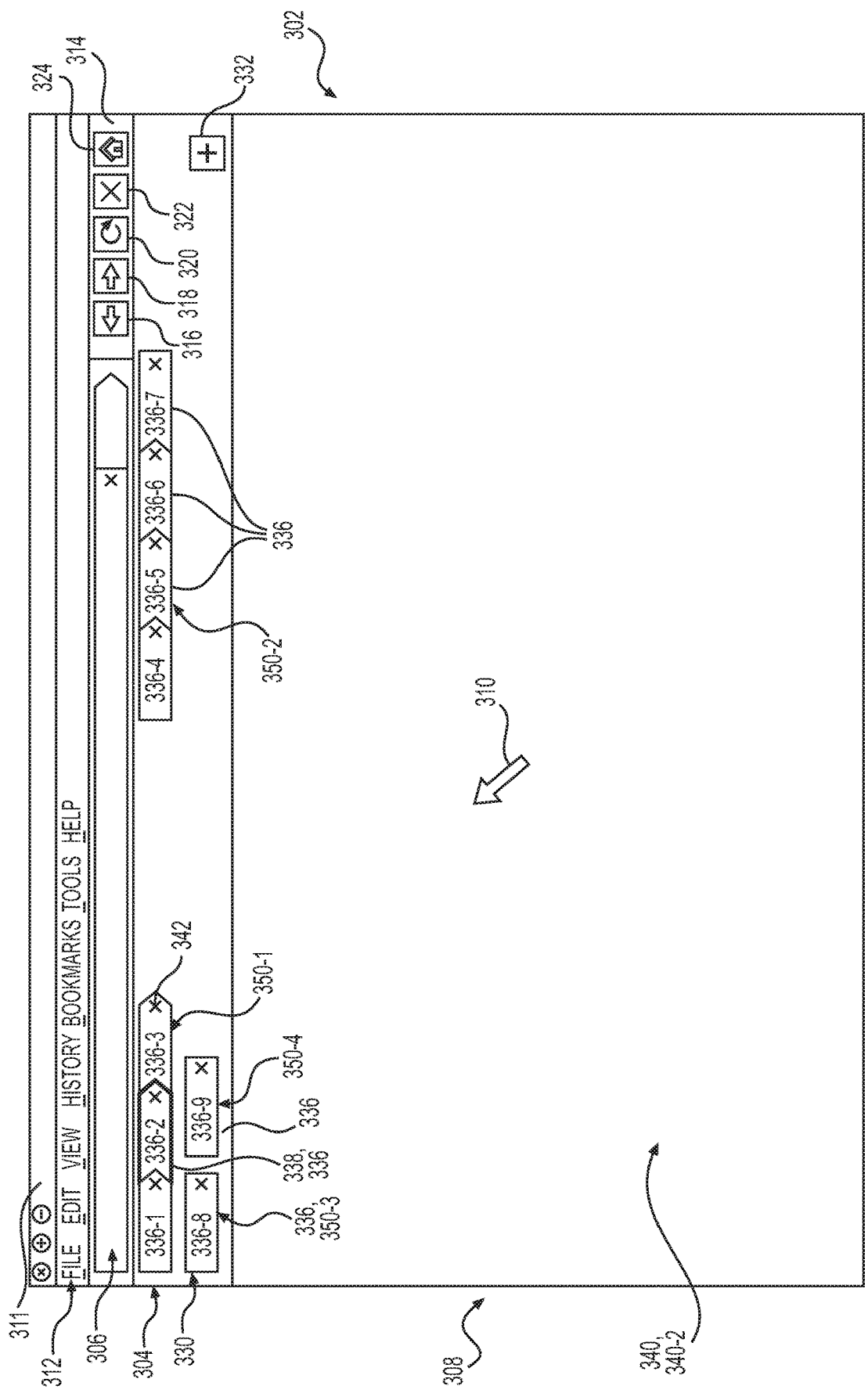
FIG. 3 is a schematic illustration of a browser window in accordance with non-limiting embodiments of the present technology.

FIG. 3 shows a browser window 302 in accordance with an implementation of the present technology. The browser window 302 has a control interface 304, a content display space 308 and a cursor 310. The content display space 308 displays the content of a web resource 340. The control interface 304 includes various elements for controlling different aspects of the browser window 302, some of which will be described below. The cursor 310 is controlled by a user input device 210 such as a mouse, or by a user's finger on a touch screen. The cursor 310 is placed in a desired portion of the browser window 302 by the user to perform a desired operation on the browser window 302 as will be described further below.

In the illustrated implementation, the control interface 304 is disposed in the upper portion of the browser window 302 while the content display space 308 is displayed in the lower portion of the browser window 302. It is however contemplated that the position of either of the content display space 308 and/or control interface 304 could be different from that shown herein. In some implementations, different elements of the control interface 304 could be positioned in different portions of the browser window 302.

The control interface 304 includes a window control panel 311 with buttons for maximizing, minimizing and closing the browser window 304. The browser window 302 also includes a menu panel 312 including the command buttons "FILE", "EDIT" "VIEW", "HISTORY", "BOOKMARKS", "TOOLS", and "HELP". It should be understood that the control buttons in the window control panel 311 and/or the command buttons of the menu panel 312 could be different than as shown herein.

The control interface 304 also includes an omnibox 306. A user can enter an address (such as a Universal Resource Locator or URL) for a desired web resource 340 in the omnibox 306 to cause display of the desired web resource in the content display space 308. A user can also enter one or more search terms in the omnibox 306 to display a search engine results page (SERP) for those terms in the content display space 308. The omnibox 306 also serves as a web resource indicator. When the content of a web resource 340 is being displayed in the content display space 308, the control interface 306 displays the address of the displayed web resource 340. When a SERP is being displayed in the content display space 308, the control interface 306 displays the address of the search engine in conjunction with the commands sent to the search engine server of the search engine for generating the SERP, the commands having been generated using the above-mentioned search terms entered into the omnibox 306.

The control interface 304 includes a navigation control panel 314 including different buttons for facilitating browsing of web resources 340, also referred to herein as navigation of web resources 340. The navigation panel 314 shown herein includes a back button 316, a forward button 318, a refresh button 320, a stop loading button 322, and a home button 324. The navigation panel 314 could have other navigation buttons not shown herein, or some of the navigation buttons could be omitted from the navigation panel. The functionality of some of navigation buttons could be provided as a menu item in the menu panel 312, instead of or in addition to, being incorporated into a navigation button in the navigational panel 314.

A tab panel 330 includes a new tab button 332 and several tabs 336 arranged in different tab groups 350. Each tab 336 is associated with a corresponding web resource 340 and has an indication of the corresponding web resource 340. For example, a tab 336 associated with a web resource "www.nytimes.com" would have a label, for example "NYT". The indication of the corresponding web resource 340 could be in the form of an icon, a logo, a symbol, a number, a colour, or any combination thereof. Each tab 336 has a tab close button 342 in the form of a small cross at the right end of the tab 336.

In the exemplary configuration of the browser window 302 of FIG. 3, there are nine tabs 336-1 to 336-9 arranged in four groups 350-1 to 350-4. Each of the nine tabs 336-1 to 336-9 is associated with a corresponding web resource 340. When shown, a web resource 340 corresponding to a tab 336-1 would be labelled as 340-1, a web resource 340 corresponding to a tab 336-2 would be labelled as 340-2, and so on. Each of the tabs 336-1 to 336-9 has an indication of the corresponding web resource 340-1 to 340-9 associated with the tab 336. In the illustrated implementation, each tab 336-1 to 336-9 is labeled with a text label indicative of the corresponding web resource 340-1 to 340-9.

In the exemplary implementation of the browser window 302 shown in FIG. 3, the first tab group 350-1 includes three tabs 336-1 to 336-2, of which the tab 336-2 is a currently activated tab 338 (shown as a tab 336 having a thicker outline than the other tabs 336). The second tab group 350-2 includes four tabs 336-4 to 336-7. The third tab group 350-3 and the fourth tab group 350-4 each comprise a single tab 336-8 and 336-9 respectively. The third and fourth tab groups 350-3 and 350-4 are arranged in a line below the first and second tab groups 350-1 and 350-2.

The content display space 308 displays the web resource 340-2 corresponding to the currently activated tab 338 (336-2). When a tab 336 other than the currently activated tab 338 is clicked on (also referred to herein as "selected", or "activated"), that tab 336 becomes the currently activated tab 338. For example, in the configuration of the browser window 302 shown in FIG. 3, where the tab 336-2 is the currently activated tab 338, if the fifth tab 336-5 is clicked on, the tab 336-5 become the currently activated tab 338 and the corresponding web resource 340-5 will be displayed in the content display space 308.

A new tab (not shown) can be added to the tab panel 330 by clicking on (selecting or actuating) the new tab button 332. The new tab 336 added to the tab panel 330 would be a blank tab associated with an empty or blank web resource 340. In the illustrated implementation, the new tab 336 is added as a new and separate group 350 in the tab panel 330. It is contemplated that, in some implementations, the new tab 336 could be added as the rightmost tab 336 of the tab group 350 including the currently activated tab 338 (thus 350-1 in the configuration of the browser window 302 shown in FIG. 4).

A user can request operations on a currently activated tab 338, or the corresponding currently displayed web resource 340. For example, the user can click the back button 316 to perform a "back operation" on from the currently displayed web resource 340 of the currently activated tab 338. As another example, a user can click on (or otherwise select) the tab close button 342 of a tab 336 to request closing of the corresponding tab 336. As yet another example, a user can click on a hyperlink in a currently displayed web resource 340 (also referred to herein as originating web resource or originating web page) to open the linked web resource 340 (also referred to herein as target web resource or target web page). When a user requests an operation such as the ones described above, the user's requested operation is executed based at least in part on a web resource type in accordance with a method 400 described below and Classification of Web Resources In the illustrated implementation, web resources 340 are classified (or identified) as one of two types: (i) hub type and (ii) node type. A web resource 340 of a hub type is also referred to herein as hub, and a web resource of a node type is also referred to herein as a node.

A hub serves as a landing page or a routing page for navigating to other pages. Examples of hub-type web resources 340 include, for example, a SERP, a news portal, a home page for an online shopping site, and the like. A user is more likely to follow links from a hub type of web resource than from a node type of web resource. Web resources 340 can be identified as a hub or a node based on any one or a combination of several different factors described below.

A web resource 340 could, in some implementations, be classified as a hub based on the number of outgoing links provided in the web resource 340.

A web resource 340 could also be classified as a hub based on behaviour patterns of users viewing the web resource 340. For example, users viewing the page "yandex.ru" typically open at least one link from the page and therefore "yandex.ru" is classified as a hub. Similarly, users viewing "travelocity.com" typically follow several links therefrom, and "travelocity.com" is classified as a hub. In some implementations, a hub threshold is defined for the number of outgoing links opened from a hub type of web resource 340 in one viewing session of the web resource 340. A web resource 340 could then be classified as a hub if the average number of outgoing links followed from the web page 340 per viewing session exceeds this pre-defined hub threshold.

The classification of a web resource 340 could also be based on a behaviour pattern of users with respect to a group of web resources 340. For example, in a group of web pages in which the web pages differ from each other only in their CGI (Common Gateway Interface) parameters, each web page could be assigned the same web resource type based on the average behaviour of all users of the web pages of the group. For example, a travel web site could have several web pages, each related to a different vacation package. In this example, each of the individual web pages related to a particular vacation package would have the same classification (hub or node), and the common classification would be based on averaging the behaviour pattern of users viewing any of the individual vacation package web pages.

A web resource 340 could also be classified as a hub based on the behaviour pattern of a particular user. For example, a particular user may frequently view a particular web resource, "weather.com" on a personal electronic device such as a laptop. In this case, the web resource could be classified as a hub for that particular user even though the web resource may not be classified as a hub generally for all users.

A web resource 340 could also be classified as a hub using machine learning and/or human judgements of particular pages or page groups. For example, a test set of web resources 340 could be used to learn the conditions for assigning a web resource type to a web resource 340. Thus, the assignment of a hub or node type to a web resource 340 could be learned or evolved with time.

A web resource 340 can be classified as a hub based on some pre-defined rules. For example, certain popular web pages 340 could be pre-defined as hubs. A list of pre-defined hub type web resources 340 could be provided to the server 120, the electronic device 110, and/or other entity that performs the classification.

In the illustrated implementation, web resources 340 that are not determined to be a hub are classified as node-type. In some implementations, other specific criteria could be used to classify a web resource 340 as a node. In some implementations, there could be more than two types of web resources 340.

The classification of a web resource 340 as a hub or a node can be based on any one or a combination of several different factors described above. The factors for classification of web resources 340 is however not to be limited to those described herein.

In some implementations, the classification (also referred to as identification) of a web resource 340 is performed at a remote server 120, i.e. a server 120 located remotely from the electronic device 110 from which the web resource 340 is being accessed using the browser application 250. In some implementations, the remote server 120 is the host server of the web resource 340. In some implementations, the remote server 120 is a web crawling server 120 performing routine web crawling operations as are known in the art. In some implementations, the classification of the web resource 340 is provided by the remote server 120 to the electronic device 110 along with the web resource 340 as a tag encoded in the source code for the web resource 340. In some implementations, the classification of the web resource 340 is stored at the remote server 120 and provided to the electronic device 110 responsive to a query triggered by an operation requested by a user accessing the web resource 340 on the electronic device 110.

In some implementations, the electronic device 110 stores the obtained web resource type for a particular web resource 340 for subsequent use when the web resource 340 is reviewed by a user of the electronic device 110. In some implementations, the identification of a web resource 340 is performed at the electronic device 110 by the processor 240 thereof based on any one or more of the factors described above.

Method

Figure 4:
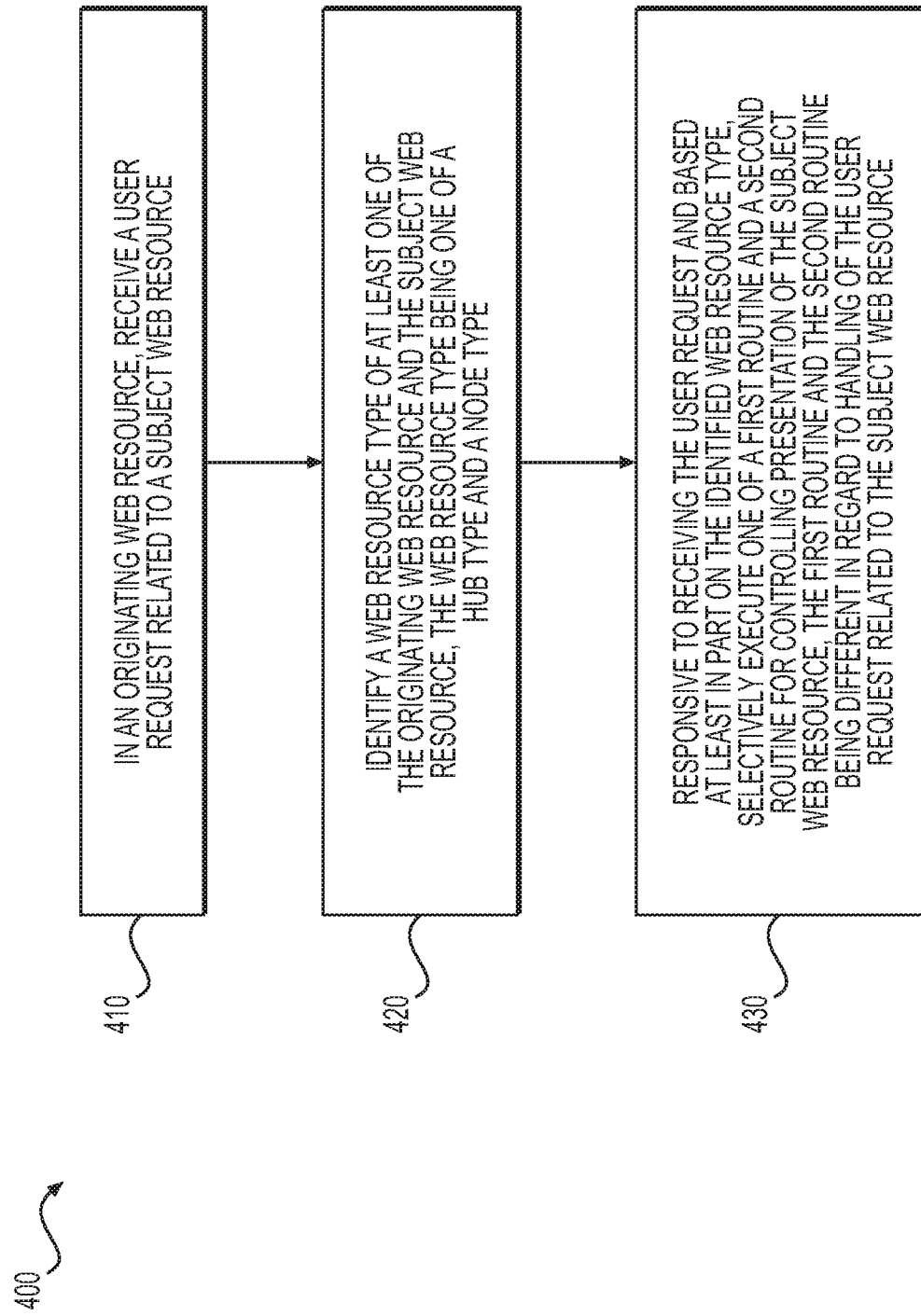
FIG. 4 is a flow chart of a method for controlling presentation of web resources in a browser window according to an embodiment of the present technology.

A method 400 according to an implementation of the present technology, for controlling presentation of web resources 340 in the browser window 302, will now be described with reference to FIG. 4. The method 400 will be described with reference to a browser window 302 displayed on the display screen 220 of the electronic device 110. The method 400 is executed by the processor 240 of the electronic device 110.

The method 400 for controlling presentation of web resources 340 in the browser window 302 starts at step 410 when the user of electronic device 110 launches the browser application 250 and a first web resource 340 is displayed in the content display space 308.

The method 400 proceeds to step 410 when a user request related to a subject second web resource 340 (subject web resource 340) is received in the first web resource 340 (originating web resource 340). Once the user request is received at step 410, the method 400 proceeds to step 420.

At step 420, the web resource type of at least one of the originating web resource 340 and the subject web resource 340 is identified. The web resource type could be received by the processor 240 of the electronic device 110 in response to a query transmitted to a remote server 120 after receiving the user request at step 410. The web resource type could be obtained by the processor 240 by parsing information stored in association with the web resource 340, for example, a tag in the source code of the web resource 340 could be indicative of the web resource 340 being a hub. The web resource type could also be obtained by the processor 240 by consulting a dictionary or pre-defined list of hubs. The pre-defined list could be stored either in the memory 260 of the electronic device 110, or at the remote server 120. It is also contemplated that the web resource type could have been previously obtained by the processor 240 and stored locally for subsequent use.

In some implementations, identifying the web-resource type also includes determining the web resource type of the web resource 340, i.e. executing the analysis of whether or not the particular web resource 340 is a hub or a node. In some implementations, the determination of the web resource type occurs in response to receiving of the user request at step 410. Determination of the web resource type responsive to receiving the user request can be executed either by the processor 240 of the electronic device 110, or by the remote server 120. In some implementations, the determination of the web resource type occurs prior to receiving the user request at step 410. In some implementations, the analysis of whether or not the particular web resource 340 is a hub or a node is performed by the same entity executing the method 400 but prior to receiving the user request, the determined web resource type is stored in memory 260 in association with the web resource 340, and then subsequently obtained for execution of the step 420 in response to receiving the user request at step 410. For example, the processor 240 of the electronic device 110 could determine the web resource type of a particular web resource 340 as part of an initial or periodic updating process, and store the determined web resource type in the memory 260 of the electronic device 110 to be retrieved upon receiving the user request at step 410.

After identification of the web resource type, at step 420, of at least one of the originating web page or the subject web page, the method 400 then proceeds to step 430.

At step 430, one of a first routine and a second routine for controlling presentation of the subject web resource 340 is selectively executed. The method 400 selects either the first routine or the second routine for execution, based at least in part on the web resource type identified at step 420 for at least one of the originating web resource 340 and the subject web resource 340. The first routine is different from the second routine.

The first and second routines of the method 400 will be described further in the context of the following exemplary scenarios:

Open Operation

In the first exemplary scenario, a user clicks on a hyperlink in an originating web resource 340 to open a subject web resource 340. In this scenario, the user request is therefore to "open" a subject web resource 340. In the specific case, of opening a web resource 340 by selecting a link, the subject web resource 340 is also referred to generally and herein as the target web resource 340.

Figure 5:
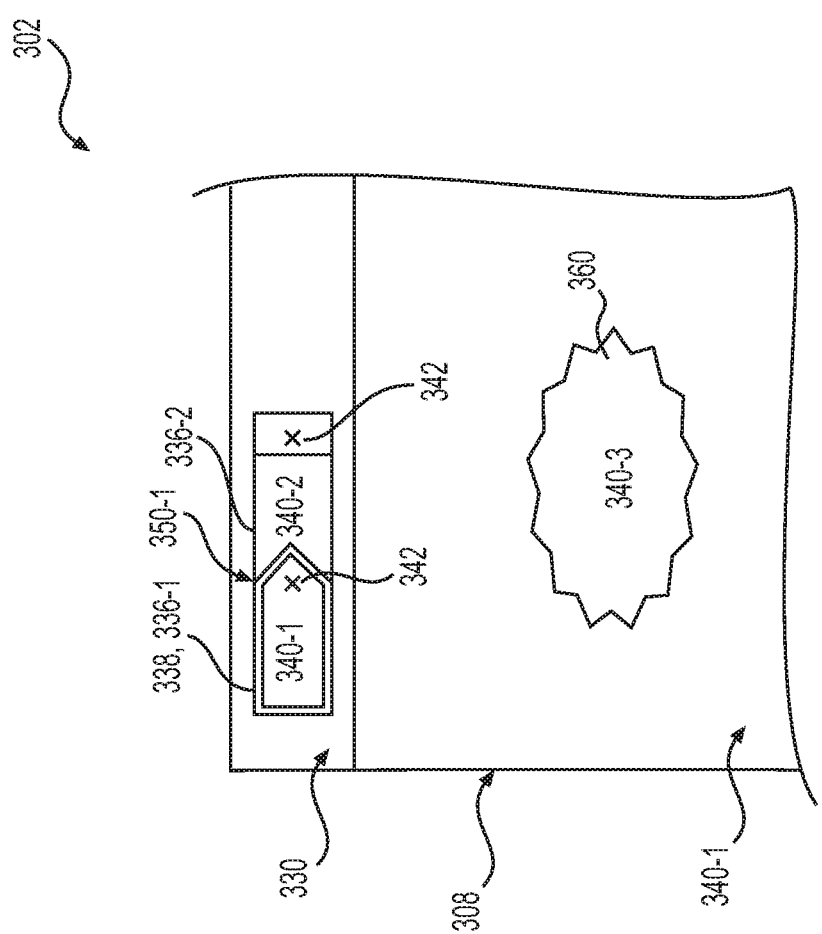
FIG. 5 is a schematic illustration of a portion of a browser window.

With reference to FIG. 5, a browser window 302 includes a tab group 350-1 having two tabs 336-1 and 336-2 with the first tab 336-1 being the currently activated tab 338 such that the content display space 308 displays the web resource 340-1 associated with the first tab 336-1. The web resource 340-1 includes a hyperlink 360 which is linked to a third web resource 340-3. A user clicks on the hyperlink 360, in the originating web resource 340-1, to perform an operation of opening the subject web resource 340-3. In this exemplary scenario, the web resource 340-1 is a hub type web resource 340. The processor 240 identifies the web resource type of the web resource 340-1 to be a hub-type and accordingly executes a first routine to open the web-resource 340-3 in a tab 336-3 other than the currently activated tab 338 (336-1) as shown in FIGS. 6 to 8.

Figure 6:
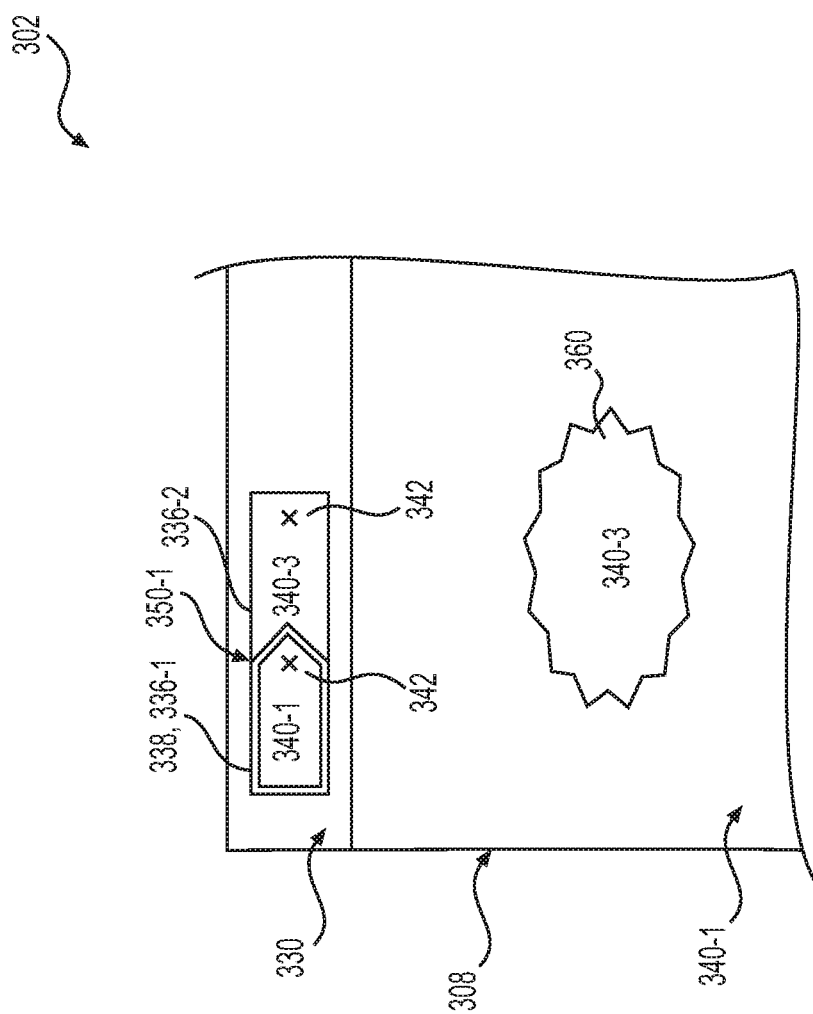
FIG. 6 is a schematic illustration of the portion of the browser window of FIG. 5 shown in a first exemplary configuration after execution of an operation thereon.

In some implementations of the first routine, as shown in FIG. 6, the web resource 340-3 is opened in a currently existing tab 336 other than the currently activated tab 338 (i.e. other than the tab 336-1 associated with the originating web resource 340-1). For example, the web resource 340-3 is opened in the second tab 336-2 so as to replace the web resource 340-2 that had been previously associated with the tab 336-2. After opening the web resource 340-3 in the tab 336-2, the method 400 could optionally automatically activate the tab 336-2 so that the web resource 340-3 is displayed in the content display space 308 of the browser window 302. Alternately, after the web resource 340-3 is opened in the tab 336-2, the tab 336-2 does not become the currently activated tab 338 until the user activates the tab 336-2.

Figure 7:
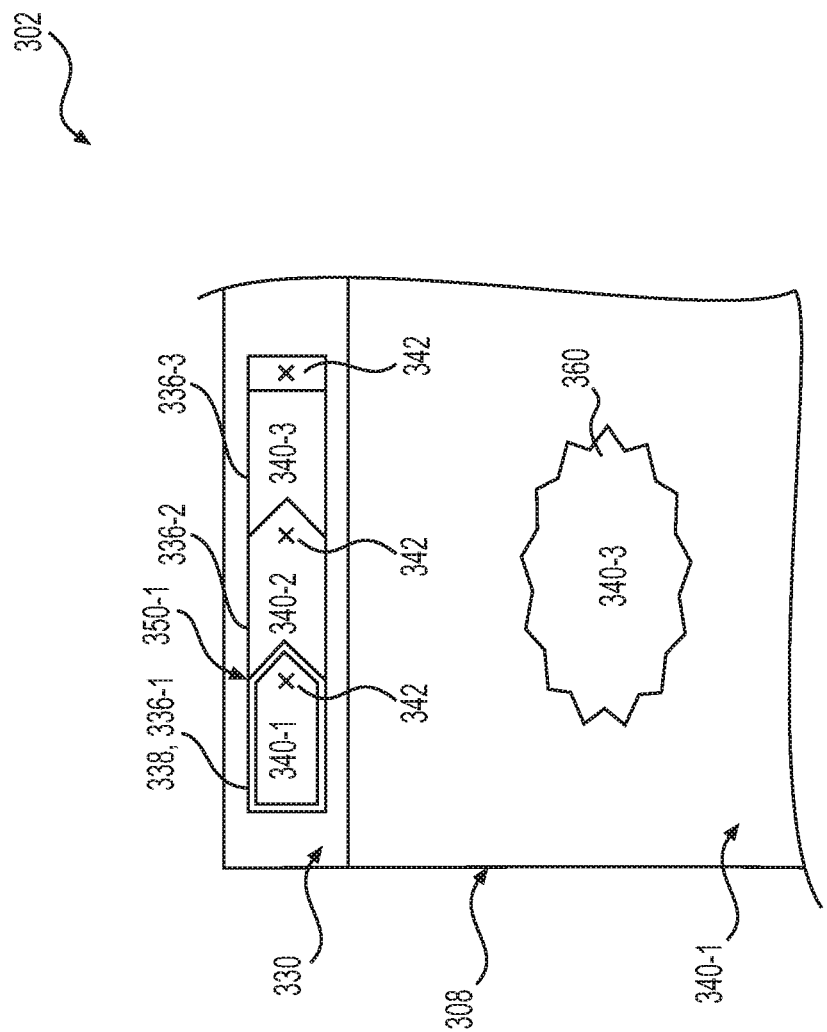
FIG. 7 is a schematic illustration of the portion of the browser window of FIG. 5 shown in a second exemplary configuration after execution of an operation thereon.
Figure 8:
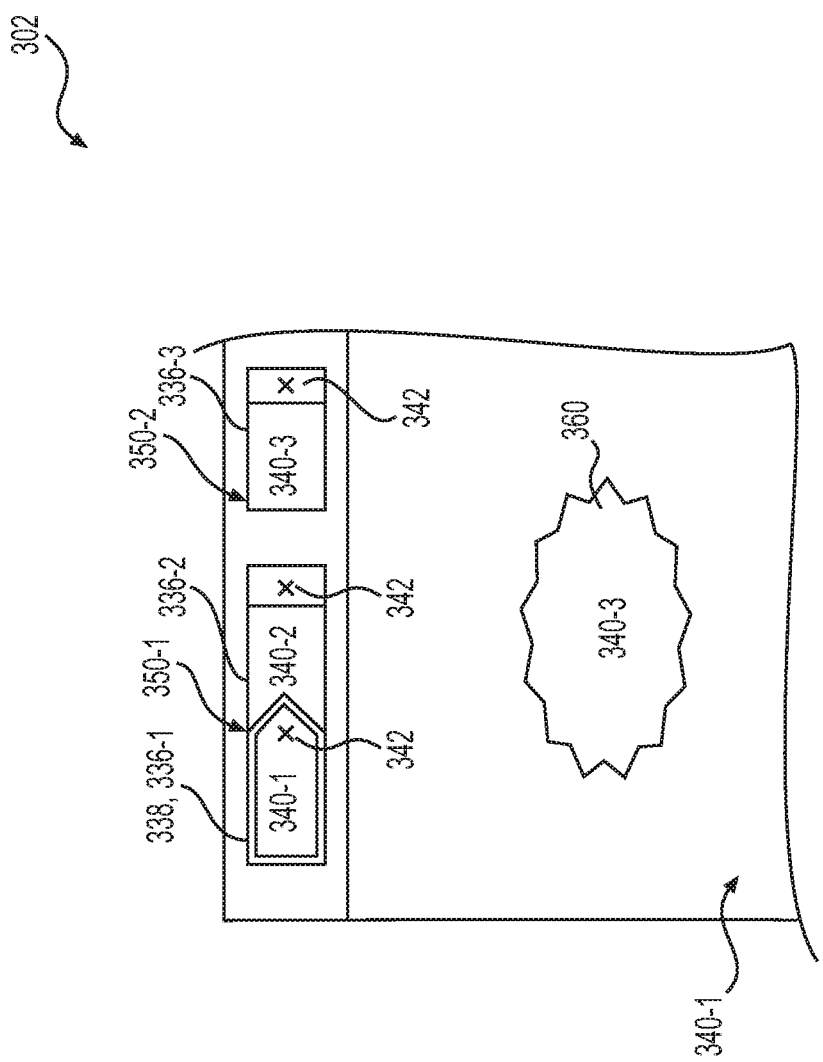
FIG. 8 is a schematic illustration of the portion of the browser window of FIG. 5 shown in a third exemplary configuration after execution of an operation thereon.

In some implementations of the first routine, as shown in FIGS. 7 and 8, a new tab 336-3 is created, and the web resource 340-3 is opened in the new tab 336-3. After opening the web resource 340-3 in the new tab 336-3, the method 400 could optionally automatically activate the new tab 336-3 so that the web resource 340-3 is displayed in the content display space 308 of the browser window 302. Alternately, after the web resource 340-3 is opened in the new tab 336-3, and the tab 336-3 does not become the currently activated tab 338 until the user selects the tab 336-3 by clicking on the tab 336-3 in the tab panel 330.

In some implementations of the first routine as shown in FIG. 7, the new tab 336-3 is arranged in the same tab group 350-1 as the currently activated tab 338, i.e. the tab 336-1 associated with the originating web resource 340-1. The new tab 336-3 could be placed to the right of the rightmost tab 336-2 of the tab group 350-1 as shown in FIG. 7, or the new tab 336-3 could be inserted immediately to the right of the currently activated tab 338, 336-1.

In some implementations of the first routine as shown in FIG. 8, the new tab 336-3 is arranged in a different tab group 350 from the currently activated tab 338. For example, the new tab 336-3 could be placed in a new tab group 350-2 as shown in FIG. 8, or the new tab 336-3 could be added to an existing group 350 other than the group 350-1 having the currently activated tab 338.

Continuing with the first exemplary scenario in which a user clicks, in an originating web resource 340-1, on a hyperlink 360 associated with a subject web resource 340-3 to create the user request to "open" the subject web resource 340-3, a second routine is executed if the originating web resource 340-1 is identified to be of the node type.

Figure 9:
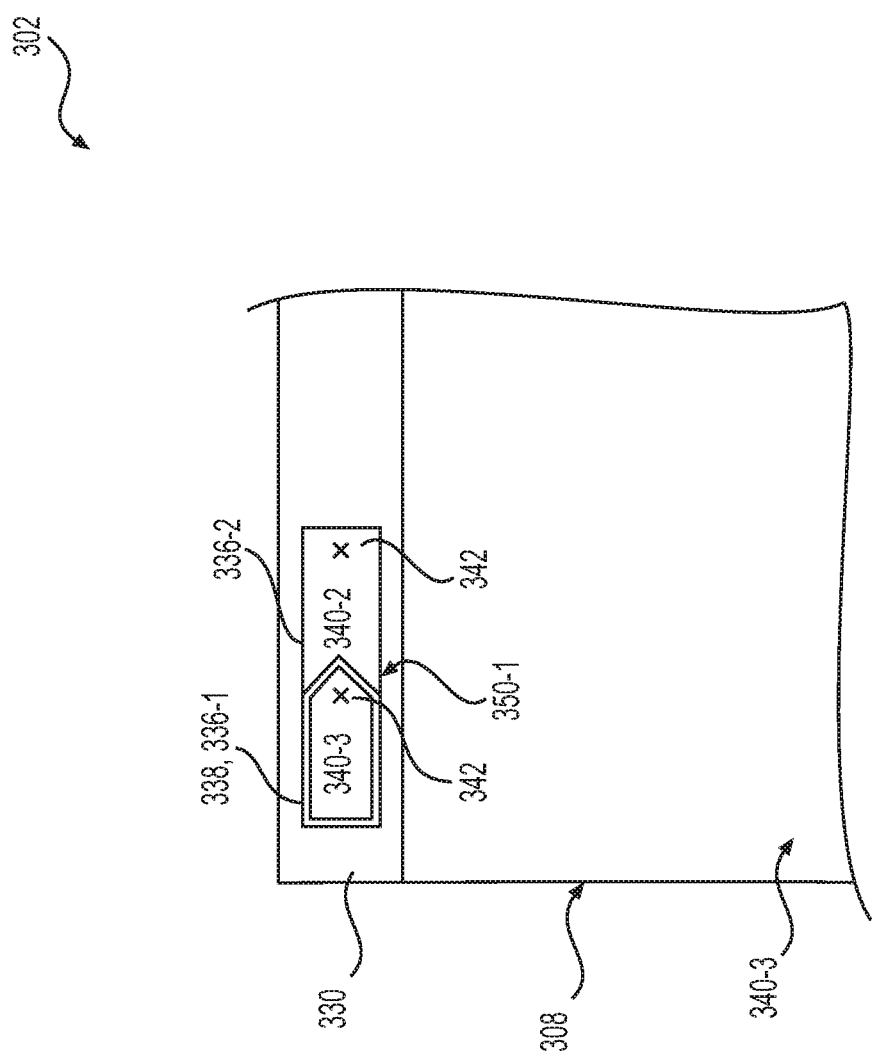
FIG. 9 is a schematic illustration of the portion of the browser window of FIG. 5 shown in a fourth exemplary configuration after execution of an operation thereon.

With reference to FIG. 9, in some implementations of the second routine, the subject web resource 340-3 is opened in the currently activated tab 338 in lieu of the originating web resource 340-1. The tab indicator of the first tab 336-1 therefore changes to indicate the web resource 340-3 instead of the web resource 340-1.

In some implementations of the second routine, the presentation of the subject web resource 340-3 is also based on the web resource type of the subject web resource 340-3. Accordingly, at step 420, the web resource type of the subject web resource 340-3 is also identified in addition to the web resource type of the originating web resource 340-1. If the subject web resource 340-3 is identified to be of the node type, the subject web resource 340-3 is opened in the currently activated tab 338 (i.e. the tab 336-1 in this scenario) in place of the web resource 340-1 as shown in FIG. 9. The tab indicator of the first tab 336-1 is therefore also changed to indicate the web resource 340-3 instead of the web resource 340-1. However, if the subject web resource 340-3 is identified to be of the hub type, a new tab 336-3 is created and the subject web resource 340-3 is opened in the new tab 336-3. As described above with respect to FIGS. 7 and 8, the new tab 336-3 could be placed in the same group 350-1 as the currently activated tab 338 (FIG. 7) or in a different tab group 350-2 (FIG. 8) from the currently activated tab 338. In some implementations of the second routine, the new tab 336-3 is automatically activated after being created so that the new tab 336-3 becomes the currently activated tab 338, and the web resource 340-3 is displayed in the content display space 308. In some implementations of the second routine, the new tab 336-3 does not become the currently activated tab 338 until selected by the user by clicking on the new tab 336-3 in the tab panel 330.

The sequence or order of tabs 336 in a tab group 350 is determined based on factors such as the sequence of opening tabs 336, the sequence of closing tabs 336, the content of the web resources 340 associated with each of the tabs 336, and the web resource type of web resource 340 associated with the tabs. In some implementations, the tab groups 350 are stacked tab groups as will be described further below.

Close Operation

In a second exemplary scenario, with reference to the browser configuration of FIG. 7, a user clicks on the close tab button 342 at the right end of the tab 336-1 to generate a user request for closing the web resource 340-1 associated with the tab 336-1. In this case, the web resource 340-1 is the subject web resource and since the close operation is requested for the tab 336-1, the tab 336-1 is referred to herein as the subject tab. The web resource 340 associated with the currently activated tab 338 is the originating web resource. Thus, in the exemplary configuration of the browser window 302 illustrated in FIG. 5, the web resource 340-1 is both the originating web resource and the subject web resource.

It should however be understood, that the user may request closing of a tab 336 other than the currently activated tab 338 by clicking on the close tab button 342 at the right end of the tab 336. In this case, the subject tab 336 would not be the currently activated tab 338, but the tab 336 on which the close operation is performed, and the subject web resource 340 would not be the web resource 340 associated with the currently activated tab 338, but the web resource 340 associated with the subject tab 336 on which the close operation is performed. For example, a user may request closing of the tab 336-2 and the corresponding web resource 340-2 while the tab 336-1 is the currently activated tab 338 and the corresponding web resource 340-1 is currently displayed in the content display space 308.

In this second exemplary scenario where the user request is for closing the subject web resource 340-1, if the subject web resource 340-1 is identified to be of the hub type at step 420, then a first routine is executed for closing the web resource 340-1.

In some implementations of the first routine for closing a hub type web resource 340-1, the subject web resource 340-1 is closed and the subject tab 336-1 is removed from the tab panel 330. In addition, any of the other open tabs 336 (in this case, specifically 336-2 and 336-3) is also closed if the web resource 340 associated therewith was opened from the subject web resource 340-1 or in a chain of web resources 340 originating from the subject web resource 340-1. As used herein, the chain of web resources 340 originating from the subject web resource 340-1 includes all successive web resources 340 opened from the subject web resource 340. For example, in the exemplary configuration of the browser window 302 illustrated in FIG. 7, if the web resource 340-2 was opened by selecting a link in the web resource 340-1 and the web resource 340-3 was opened by selecting a link in the web resource 340-2, the chain of web resources 340 originating from the subject web resource 340-1 includes the web resources 340-2 and 340-3.

Still with reference to the browser configuration of FIG. 7, in this second exemplary scenario, in which the user request is for closing the subject web resource 340-1, if the subject web resource 340-1 is identified to be of the node type at step 420, then a second routine is executed for closing the web resource 340-1. Executing the second routine includes closing the subject web resource 340-1 and removing the subject tab 336-1 from the tab panel 330. However, the second routine does not include closing other open tabs 336 as in the first routine.

In some implementations, in addition to closing the subject web resource 340-1 and closing the subject tab 336-1, a tab 336 other than the subject tab 336-1 is activated. In some implementations, the subsequently activated tab 336 is associated with a web resource 340 that is a hub type web resource from which the subject web resource 340-1 was opened. It is contemplated that in the case where the subject web resource 340-1 being closed was not opened from one of the web resources 340 associated with a currently open tab 336, then the subsequently activated tab 336 could be a tab 336 associated with a web resource 340 that was opened immediately prior to or immediately after the subject web resource 340-1. The subsequently activated tab 336 could be another tab 336 that is located physically adjacent to the subject tab 336-1 being closed.

Back Operation

In a third exemplary scenario, a user clicks on the back button 316 to request a back operation with respect to the web resource 340 being displayed in the content display space 308, and being associated with the currently activated tab 338. In this case, the web resource 340 associated with the currently activated tab 338 is the subject web resource, as well as the originating web resource. Furthermore, in this scenario, the subject tab 336 is the currently activated tab 338 for which the user requests a back operation.

If the subject web resource 340 for the back operation is identified to be of the hub type at step 420, then a browser history for the currently activated tab 338 is obtained. If the obtained browser history is indicative of the subject web resource 340 being the earliest opened web resource 340 for the currently activated tab 338 the subject web resource 340 and the associated tab 336 are closed. If the browser history for the currently activated tab 338 is indicative of an earlier association with another web resource 340, the earlier web resource 340 is opened in the currently activated tab 338 and displayed in the content display space 308. In addition to closing the subject tab 338 or displaying a previously accessed web resource 340, any of the other open tabs 336 associated with a web resource 340 that is in a chain of web resources 340 originating from the subject web resource 340 will also be closed in the first routine.

If at step 420, the subject web resource 340 is identified to be of the node type, a second routine is executed for the back operation. Executing the second routine includes obtaining a browser history for the currently activated tab 338. If the obtained browser history is indicative of the subject web resource 340 being the earliest opened web resource 340 for the currently activated tab 338 the subject web resource 340 and the associated tab 336 are closed. If the browser history for the currently activated tab 338 is indicative of an earlier association with another web resource 340, the earlier web resource 340 is opened in the currently activated tab 338 and displayed in the content display space 308. Executing the second routine does not however include closing any of the other open tabs 336 in contrast to the first routine.

In some implementations, the method 400 provides two kinds of back operation elements corresponding to two kinds of back operations. The back button 316 continues to provide the functionality of allowing the user to request a back to previously accessed web resource operation. In addition, another "back to hub" element 346 (FIG. 10) could be provided in each tab 336, or in the tab panel 330 which can be selected by the user to request navigation from the currently activated tab 338 to a currently open tab 336 that is associated with a web resource 340 of a hub type and from which the subject web resource 340 was opened.

Figure 10:
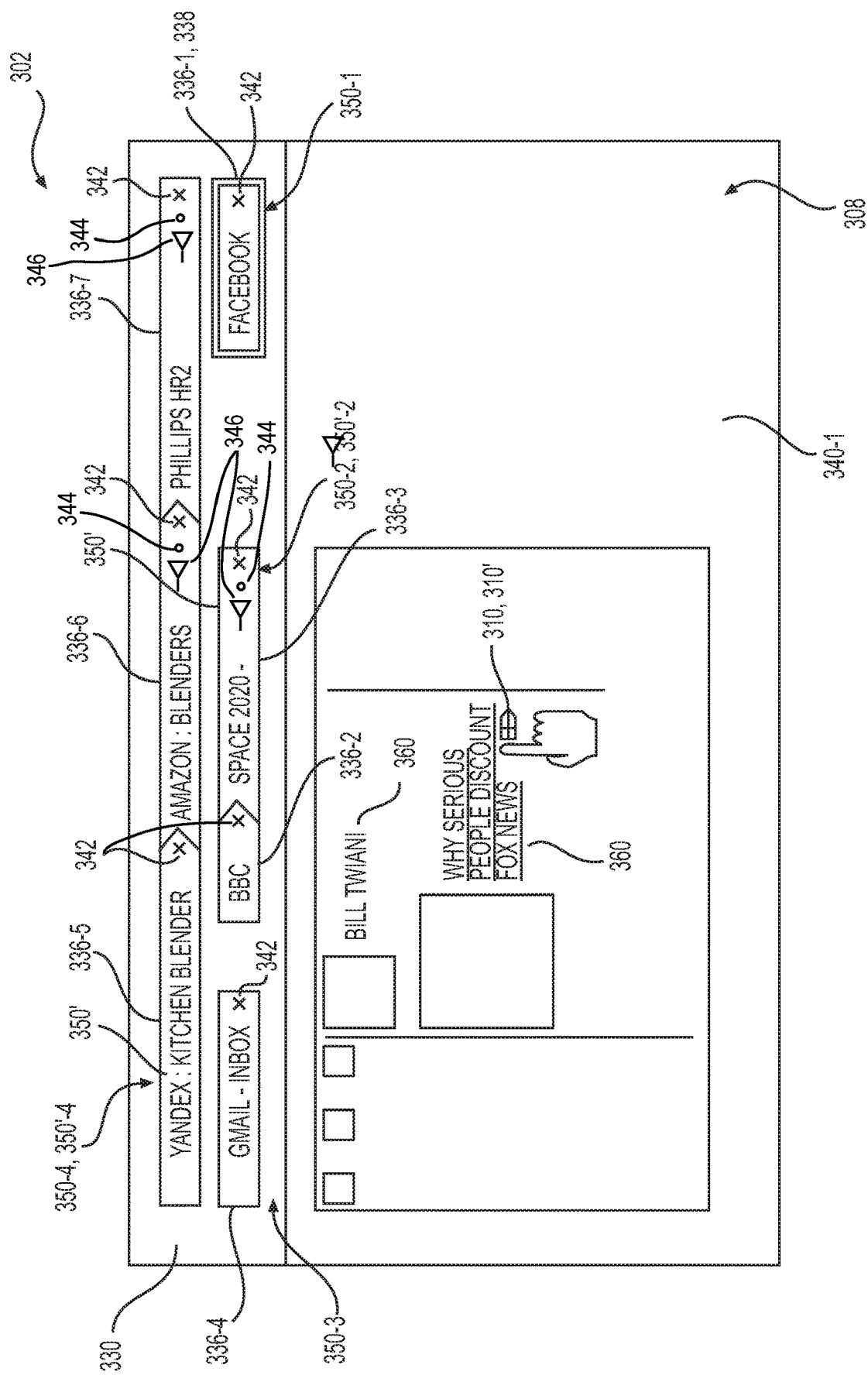
FIG. 10 is an illustration of a portion of a browser window shown in an exemplary configuration.

In some implementations of the method 400, responsive to an identification of the web resource type of the currently displayed web resource 340, the cursor 310 is modified to be indicative of the web resource type of the web resource 340 being currently displayed in the content display space 308. Thus, the cursor 310 could be a modified form 310' when the currently displayed web resource 340 is identified to be of a hub type. FIG. 10 shows a cursor 310 in a modified form 310' on a hub type web page 340. Prior to performing identification of the currently displayed web page 340, or if the currently displayed web page 340 is identified to be of a node type, the cursor 310 would be in its conventional form, for example in the shape of an arrow, as seen in FIG. 3. It should be understood that the specific shape and details of the cursor 310 in its conventional form 310 and/or modified form 310' could be different than as shown herein.

In some implementations of the method 400, responsive to an identification of the web resource type of the currently displayed web resource 340, the form of the tab 336-1 in the tab panel 330 is modified to be indicative of a hub type web resource 340 being associated with the tab 336. For example, in FIG. 5, the shape of the tab 336-1 (corresponding to a hub type web resource 340-1) is different from the shape of the tab 336-2 (corresponding to a node type web resource 340-1).

Exemplary Implementation of Method

The implementation of the method 400 will now be described with reference to FIG. 10 in the context of a particular configuration of a browser window 302 shown therein.

The configuration of the browser window 302 shown in FIG. 10 is generated by an exemplary sequence of browsing events listed below:

(1) User opens a "Facebook" tab 336-1 and the corresponding web page 340-1 by selecting the BOOKMARKS button in the menu panel 312, and selecting from the list of bookmarks stored therein, a bookmark for Facebook™. As a result of the user's request, the Facebook™ page 340 is displayed in the display space 308.

(2) The user then opens a new tab 336-2, selects the new tab 336-2 to have it become activated, and types the URL "www.bbc.com" in the omnibox 306. The new tab 336-2, labeled "BBC", is placed in the tab panel 330 in a new group 350-2 separated from the group 350-1 having the Facebook™ tab 336-1. The BBC homepage (not shown) is displayed in the content display space 308.

(3) In the BBC homepage, the user views a variety of content, such as, news articles, advertisements, and the like, including several links. The user clicks a link (not shown) for "Space 2020" in the BBC homepage. The processor 240 identifies the BBC homepage to be of a hub type, and consequently opens the web page "Space 2020" in a new tab 336-3, labeled "Space 2020" grouped with the BBC tab 336-2.

(4) The user then opens another new tab 336-4, selects the new tab 336-4 to have it be activated, and opens Gmail™ web page (not shown) using a bookmark therefor in the BOOKMARKS button of the menu panel 312. The tab 336-4, labeled "Gmail" is placed in a new tab group 350-3 separated from the tab groups 350-1 and 350-2.

(5) The user then opens yet another new tab 336-5 and generates a Yandex™ SERP (not shown) for kitchen blenders by typing "kitchen blender for sale" in the omnibox 306 after activating the tab 336-5. The new tab 336-5, placed in a new tab group 350-4 separated from the tab groups 350-1 350-2, and 350-3, and labeled "Yandex:kitchen blenders". The corresponding SERP is displayed in the display window 308.

(6) The user views the Yandex™ SERP associated with the tab 336-5 and clicks on a search result therein for an Amazon™ web page on kitchen blenders thereby requesting opening of the corresponding Amazon™ blenders web page (not shown). The Yandex™ SERP web page is identified to be of a hub type and the selected Amazon™ blenders page is opened in a new tab 336-6 grouped with "Yandex:kitchen blenders" tab 336-5. The new tab 336-6 is labeled "Amazon: Blenders" indicative of the corresponding web page (not shown).

(7) The user selects the "Amazon:Blenders" tab 336-6 in the tab panel 330 to have it become activated and in order to view the corresponding web page in the display window 308. The user clicks on a link for a Phillips™ blender in the Amazon™ blenders web page. The Amazon™ blenders page is determined to be a hub, and the linked Phillips™ blender web page is therefore opened in new tab 336-7 stacked with the "Amazon: Blenders" tab 336-6.

(8) The user then clicks on the "Facebook" tab 336-1 in the tab panel 330 to reactivate the "Facebook" tab 336-1 and review the corresponding Facebook™ web page. FIG. 10 shows the configuration of the browser window 302 after the above sequence of events has occurred. The Facebook tab 336-1 is the currently activated tab with the Facebook web page 340-1 being displayed in the content display space 308.

As can be seen, the cursor 310 hovering over the content display space 308 and controlled by the user is in its modified form 310' indicative of the currently displayed web page 340-1 being of a hub-type.

In this browser window configuration 302 shown in FIG. 10, if the user clicks on the link 360 for the blog post "Why serious people . . . ", the link 360 will be opened in a new tab (not shown) placed in the tab group 350-1 grouped with the "Facebook" tab 336-1 since the originating web page 340, i.e. the Facebook™ page 340-1 is of a hub type.

Stacking Tabs

In some implementations, a tab group 350 generated by the method 400 is a stacked tab group 350', also referred to herein as a tab stack 350'. In the tab stack 350', the tabs 336 are in a stacked relationship with one another, the stacked relationship being based on the web resource type of the web resources 340 corresponding to each tab 336 in the tab stack 350.

In the exemplary configuration of the browser window 302 of FIG. 10 described above, the tab groups 350-2 and 350-4 are tab stacks, respectively labeled as 350'-2 and 350'-4.

A tab stack 350' includes a plurality of stacked tabs 336 including a bottom tab 336 and a topmost tab 336. The web resource 340 associated with the bottom tab 336 is of a hub type while the web resource 340 associated with the topmost tab 336 can be of either type (hub or node). In the illustrated implementation, a node type of web resource 340 can be open only in the topmost tab 336 of the tab stack 350'.

Figure 11:
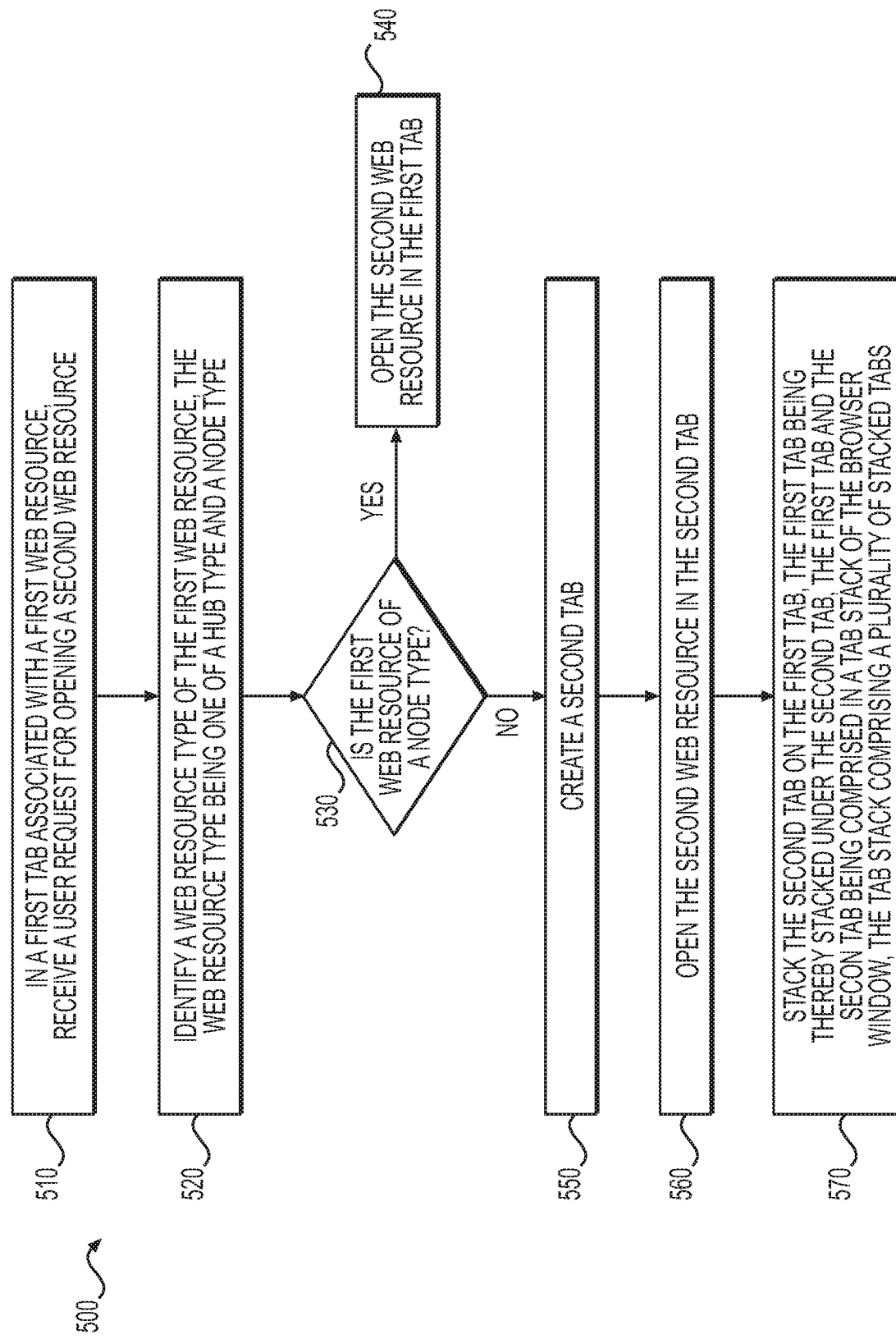
FIG. 11 is a flow chart of a method for stacking tabs according to an embodiment of the present technology.

A method 500 for stacking tabs 336' and tab stacks 350' will now be described with reference to FIGS. 11 and 12. The method 500 is executed at the electronic device 110 by the processor 240.

At step 510, in a first tab 336 associated with a first web resource 340, a request for opening a second web resource 340 is received.

Using the example of the tab group 350'-4 of FIG. 10, the first web resource 340 is the Yandex SERP (not shown) opened in the first tab 336-5. The second web resource 340 is Amazon web page for blenders (not shown). The user requests opening of the Amazon web page for blenders by clicking on a link in a search result in the Yandex SERP page.

At step 520, the web resource type of the first web resource 340 is identified.

Implementational details of the identification step 500 are similar to those described above with reference to step 420 of the method 400. In the example of the tab group 350'-4 of FIG. 10, the web resource type of the Yandex SERP is identified.

If at step 530, the first web resource 340 is determined to be of a node type, the method 500 proceeds to step 540 where the second web resource 340 is opened in the first tab 336 replacing the first web resource 340.

If at step 530, the first web resource 340 is determined to be of a hub type, the method 500 proceeds to step 550 where a second tab 336 is created. Then at step 560, the method 500 opens the second web resource 340 in the second tab 336. In the example of the tab group 350'-4 of FIG. 10, the Yandex SERP (first web resource 340) is determined to be of the hub type, a new tab 336-6 (second tab) is created and the Amazon Blenders page (second web resource 340) is opened in the new tab 336-6.

At step 570, the second tab 336 is stacked on the first tab 336. The first tab 336 is therefore stacked under the second tab 336. The first and second tabs 336 form a tab stack 350'. The tab stack 350' includes a plurality of tabs 336 in a stacked relationship with each other. It should be understood that the stacking relationship of the tabs 336 in the tab stack 350' does not refer to their physical positioning with respect to each in the browser window 302, but in an internal representation thereof in the memory 260 associated with the processor 240 of the electronic device 110 for the purposes of the executing operations on the tabs 336 and the associated web resources 340. Each tab 336 of a tab stack 350' is associated with a corresponding pointer 356 which serves as the representation of the tab 336 for handling of user requests related to the tab 336. When a user requests an operation on one of the stacked tabs 336, the execution of the request is based on the stacking relationship of the tabs 336, i.e. of their respective pointers 356.

Again with reference to the exemplary browser window configuration of FIG. 10, in the tab group 350-4, the Yandex SERP tab 336-5 and the Amazon blenders tab 336-6 form a stacked group 350'-4 in which the Amazon blenders tab 336-6 is stacked on the Yandex SERP tab 336-5 and the Yandex SERP tab 336-5 is stacked under the Amazon blenders tab 336-6. The Amazon blenders tab 336-6 is physically positioned on a right side of the Yandex SERP tab 336-5, however "stacking on" and "stacking under" refers to their internal representations within the browser application 250 as shown in FIG. 12. With reference to FIG. 12, the Yandex SERP tab 336-5 (the first tab) is associated with a first pointer 356-1 and the Amazon Blenders tab 336-6 (second tab) is associated with a second pointer 356-2. The stacking relationship of the tabs 336-5 and 336-6 can be represented as shown in FIG. 12 where the second pointer 356-2 is stacked on the first pointer 356-1. When a user requests an operation on one of the stacked tabs 336-5 and 336-6, the execution of the request is based on the stacking relationship of the tabs 336-5 and 336-6, i.e. of their respective pointers 356-1 and 356-2.

Figure 12:
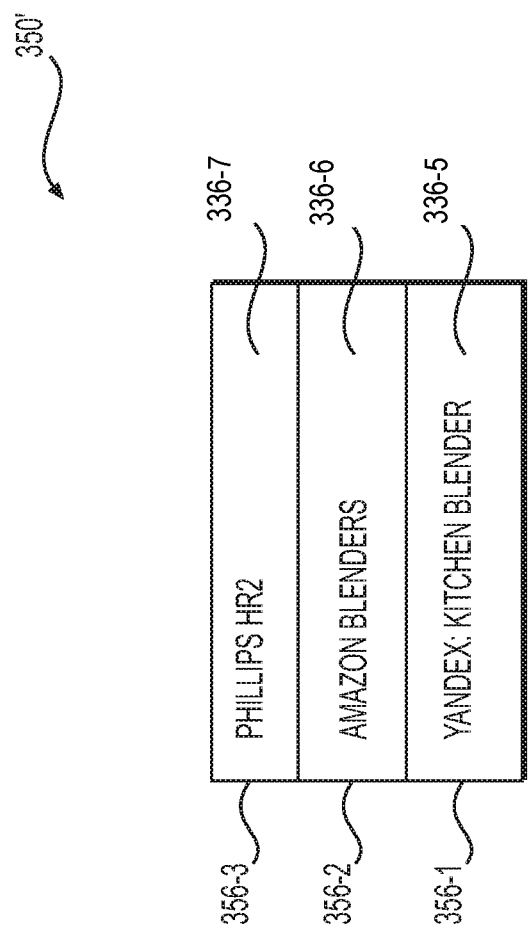
FIG. 12 is an exemplary representation of a tab stack of the exemplary configuration of the browser window portion of FIG. 10.
Figure 13:
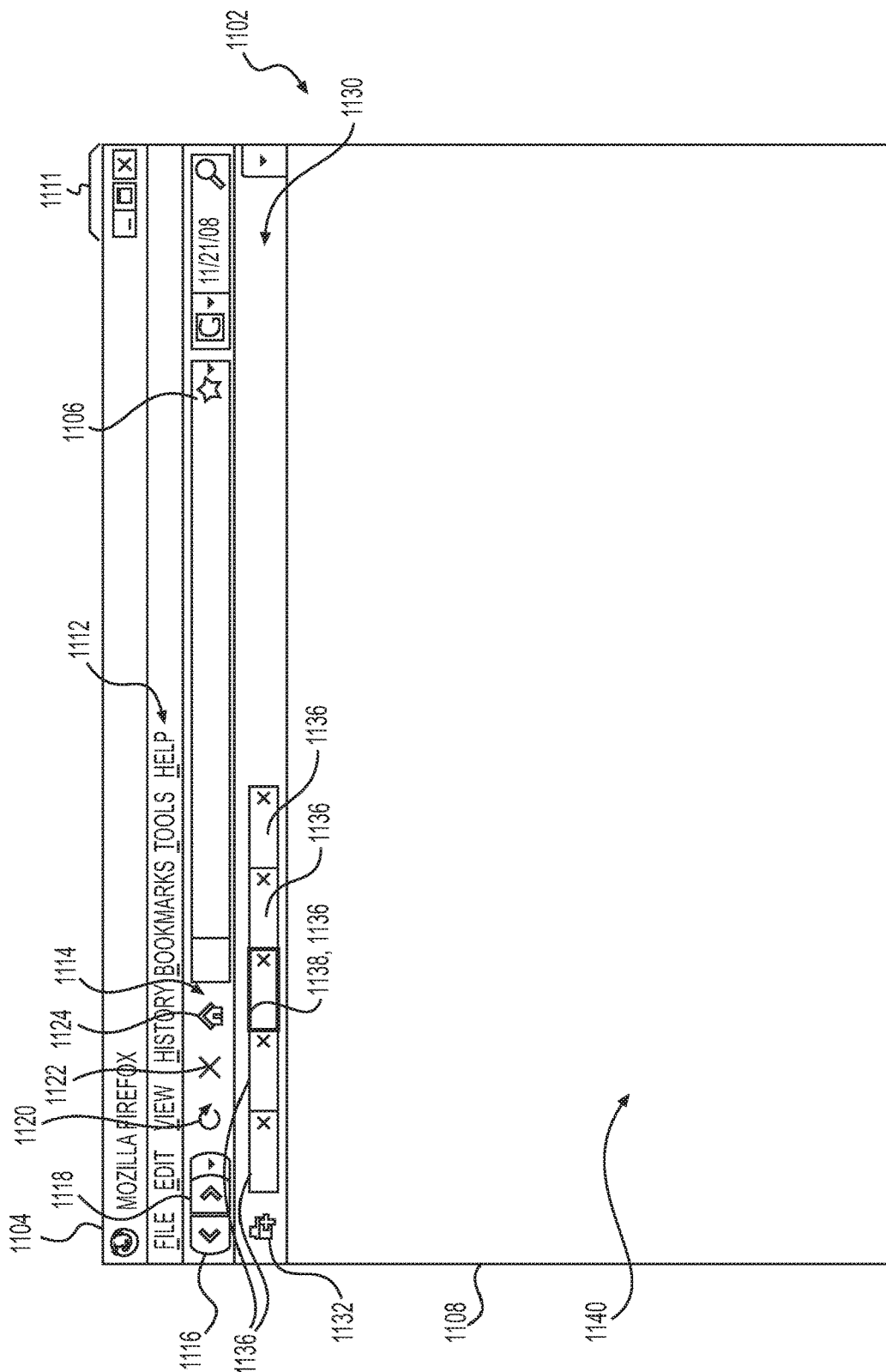
FIG. 13 is a schematic illustration of a prior art browser window and browser application.

Continuing with the description of the browser configuration and tab stack 350'-4 of FIGS. 10 and 12, the user views a number of different results in the Amazon blenders page (not shown) displayed in the tab 336-6 and selects a link therein for a Phillips HR2 blender, thereby requesting opening of the Philips HR2 blender page (not shown). The Amazon blenders page is determined to be a hub and the Phillips blender page is opened in a new tab 336-7. In the browser window 302, the Phillips HR2 tab 336-7 (third tab) is physically positioned on a right side of the Amazon Blenders tab 336-6 (second tab) but the internal representation as seen in FIG. 12, the third tab 336-7, is stacked on the second tab 336-6 which is stacked on the first tab 336-5. i.e., the pointer 356-3 associated with the third tab 336-7 is stacked on the pointer 356-2 associated with the second tab 336-6 which is in turn stacked on the pointer 356-1 associated with the first tab 336-5. The third tab 336-7 is thus stacked above the first tab 336-5 and the first tab 336-5 is stacked below the third tab 336-7.

If the user were to click on a link in the Phillips HR2 page, the Phillips HR2 page would be determined to be a node, and the requested linked web page would be opened in the third tab 336-7 replacing the Phillips HR2 web page. The third tab 336-7 and its pointer 356-3 would now be associated with the new requested web page while the third tab 336-7 would remain internally stacked on the second tab 336-6.

After viewing the Phillips HR2 page in the third tab 336-7, if the user clicks on the first tab 336-5 in order to review the Yandex SERP in the first tab 336-5, the browser application 250 would cause the second and third tabs 336-6 and 336-7 stacked respectively on and above the first tab 336-5 to close. In addition the first tab 336-5 would become the currently activated tab 338 and Yandex SERP associated with the first tab 336-5 would be displayed in the content display space 308.

Thus, in a tab stack 350', a lower tab 336 can be activated only by closing any tabs 336 that may be stacked on and above the desired tab. A lower tab 336 of the tab stack 350', for example, 336-5 corresponds to a tab 336 created prior to a higher tab 336 of the tab stack 350', for example, tab 336-7.

While viewing a web resource 340 of a tab stack 350', if a user clicks on a tab 336 of a different tab group 350, the stacked tabs 336 of the tab stack 350' will not be closed. Thus, for example, in the exemplary sequence of events described above with respect to FIG. 10 and the exemplary browser configuration shown therein, when the user then clicks on the "Facebook" tab 336-1 in the tab panel 330 to reactivate the "Facebook" tab 336-1 and review the corresponding Facebook web page, the previously activated "Yandex:kitchen blenders" tab 336-5 and the other tabs 336-6, 336-7 stacked therewith are left open when the "Facebook" tab 336-1 is reactivated.

In a tab stack 350', if a user clicks on the close tab button 342 associated with a subject tab 336 of the tab stack 350', any tabs 336 stacked on and above the subject tab 336 will also be closed in addition to closing the subject tab 336. For example, if the user clicks on the close tab button 342 for the second tab 336-6, the second tab 336-6 as well as the third tab 336-7 stacked on the second tab 336-6 will be closed.

In the tab stack 350', if a user clicks on the back button 316 in the currently activated tab 338 to request opening a previously browsed page 340 instead of the currently open web page (subject web page) 340, the browser history for the currently activated tab 338 will be obtained and a previously accessed web page 340 obtained therefrom will be opened in the currently activated tab 338. In addition, to opening the previously accessed web page, any tabs 336 stacked above the currently active tab 338 will also be closed.

In some implementations, if the browser history indicates that the currently open web page (subject web page) is the earliest accessed web page of the currently activated tab 338, the currently activated tab 338 will be closed. The tab 336 stacked under the currently activated tab 338 (subject tab) then becomes activated thereby displaying the originating web page 340 from which the subject web page 340 was opened. For example, if the user clicks the back button 316 from the third tab 336-7 while viewing the Phillips HR2 web page, the third tab 336-7 will be closed since the Phillips HR2 web page is the earliest accessed web for the third tab 336-7. In addition, the Amazon Blenders tab 336-6 will become activated. The web page (Amazon blenders) displayed in the new currently activated tab 336-6 is the originating web page (hub) from which the Phillips HR2 page (node) had been opened.

In some implementations, as mentioned above the browser application 250 provides a "back to hub" element or operator 346, which can be selected by the user to request navigating back to the originating hub type web page 340 from which the currently open web page 340 was opened. In the illustrated implementation, the back to hub element 346 is provided for each tab 336 stacked on another tab 336. It is however contemplated that the back to hub element 346 could instead be a button on the tab panel 330. In this implementation, the back button 316 continues to provide the option of opening a previously opened web page 340 in the currently activated tab 338. Thus, if the user selects the back button 316, the browser history for the currently active tab 338 will be obtained, and any previously opened web page 340 will be accessed as described above. If the user selects the "back to hub" operator, the currently activated tab 338 will be closed and the tab 336 corresponding to the originating hub type web page 340 will be activated by the browser application.

In some implementations, the user can request a stacked tab 336 be moved from the tab stack 350'. In some implementations, a subject tab 336, for example 336-6 can be removed from the tab stack 350' by clicking on the subject tab 336 (but not on the close button 342 thereof), and releasing the subject tab 336-6 after dragging to a different location on the tab panel 330. In some implementations, as shown in FIG. 10, a move tab element 344, in the shape of a small circle or a pin, is provided on each tab 336 of the tab stack 350' which is stacked on another tab 336. The move tab element 344 of a tab 336 can be selected by the user, and dragged to a different location of the tab panel 330, to request moving of the corresponding tab 336 from the tab stack 350'.

In the exemplary tab stack 350'-4 of FIG. 10, in response to the user clicking and dragging the subject tab 336-6 to a different location in the tab panel 330, the subject tab 336-6 will be removed from the tab stack 350' and placed in a new tab group 350. In some implementations, the tabs 336 that were stacked on and above the subject tab 336-6 (i.e. the tab 336-7 in this exemplary scenario) before it was moved from the tab stack 350' will be closed. In some implementations, the tabs 336 stacked on and above the subject tab 336-6 (i.e. the tab 336-7 in this exemplary scenario) before it was removed from the tab stack 350' will be moved with the subject tab 336-6 to the new tab group 350. In some implementations, the new tab group 350 will be a stacked tab group 350' in which the tabs 336 will remain in the same stacked relationship with each other in the new tab group 350' as in the original tab stack 350'.

In some implementations, a user can select and drag a plurality of stacked tabs 336 of the tab stack 350' for removal therefrom. Any tabs stacked above the subset of tabs 336 selected for removal will be closed by the browser application 250 in addition to moving the user-selected subset of stacked tabs 336 to the new group 350. In some implementations, the new tab group 350 will be a stacked tab group 350' in which the subset of user-selected tabs 336 will remain in the same stacked relationship with each other in the new tab group 350' as in the original tab stack 350'.

In some implementations, a new tab modifier element is provided to allow a user to request opening a linked target web page in a new tab 336 regardless of the web resource type of the originating web page 340 or the target web page. In the illustrated implementation, the new tab modifier element is the shift key of the keyboard 210 of the electronic device 110. A user can request opening of a target web page 340 in a new tab 336 by holding down the shift key while selecting the hyperlink for the desired target web page 340. In this case, the target web page 340 will be opened in a new tab 336 in a new group 350 and the new tab 340 will thus not be stacked with the tabs 336 of the tab stack 350'.

In some implementations, the hyperlink for the target page 340 includes a new tab tag. For example, the new tab tag could be encoded in the hyperlink by the host server 120 of the target web page 340. When the user clicks on a hyperlink in an originating web page 340 to request opening of a target web page 340, if the browser application 250 obtains a new tab tag associated with the target web page 340, the target web page 340 will be opened in a new tab 336 regardless of the web resource type of the originating web page 340 or the target web page 340 the linked web page. In this case as well, the target web page 340 will be opened in a new tab 336 in a new group 350 and the new tab 340 will thus not be stacked with the tabs 336 of the tab stack 350'.

The method 500 for stacking tabs 336 has been described above with reference to a SERP but it should be understood that the implementation of the method 500 for stacking tabs 336 is not limited to a SERP, but can be implemented generally for any series of interlinked web resources 340 which can be classified as one of a plurality of different types of web resources 340.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

One skilled in the art will appreciate when the instant description refers to "receiving data" from a user that the electronic device executing receiving of the data from the user may receive an electronic (or other) signal from the user. One skilled in the art will further appreciate that displaying data to the user via a user-graphical interface (such as the screen of the electronic device and the like) may involve transmitting a signal to the user-graphical interface, the signal containing data, which data can be manipulated and at least a portion of the data can be displayed to the user using the user-graphical interface.

Some of these steps and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of stacking tabs in a tab panel of a browser window, the tab panel facilitating multiple web pages being open simultaneously in the browser and allowing a user to switch between viewing any one of the multiple web pages, the method being executable by an electronic device, the method comprising:
in a first tab associated with a first web resource, receiving a user request for opening a second web resource;
identifying whether a web resource type of the first web resource is of a hub type, the hub type corresponding to a web resource serving as a routing page for navigating to other web resources;
responsive to the web resource type of the first web resource not being of the hub type, identifying the web resource type of the first web resource type as being of a node type;
responsive to the first web resource being of the node type, opening the second web resource in the first tab in lieu of the first web resource;
responsive to the first web resource being of the hub type, creating a second tab;
opening the second web resource in the second tab; and
stacking the second tab on the first tab, the first tab being thereby stacked under the second tab, the first tab and the second tab being comprised in a tab stack of the browser window, the tab stack comprising a plurality of stacked tabs currently open therein; and
responsive to receiving a user request for switching from any one of the plurality of stacked tabs to a subject tab thereof in the tab stack, the switching comprising selecting the subject tab from the plurality of stacked tabs currently open in the tab stack for a presentation of a web resource associated therewith:
activating the subject tab; and
closing each tab of the plurality of stacked tabs in the tab stack being stacked on and above the subject tab having been originated therefrom without closing the subject tab; and
responsive to receiving a user request for a back operation from a subject web resource associated with the subject tab of the tab stack:
closing each tab of the tab stack being stacked one of on and above the subject tab responsive to the subject web resource being of the hub type;
accessing a browser history for the subject tab;
responsive to the browser history including a previously accessed web resource, opening the previously accessed web resource in the subject tab; and
responsive to the browser history being indicative of the subject web resource being an earliest accessed web resource, closing the subject tab.

2. The method of claim 1 further comprising:
providing a first back operation element selectable by the user for requesting a first back operation; and
providing a second back operation element selectable by the user for requesting a second back operation;
responsive to receiving a user request for the first back operation, executing a first back operation routine comprising:
responsive to the subject web resource being of the hub type, closing each tab of the tab stack being stacked on the subject tab;
accessing a browser history for the subject tab;
responsive to the browser history including a previously accessed web resource, opening the previously accessed web resource in the subject tab; and
responsive to the browser history being indicative of the subject web resource being an earliest accessed web resource, closing the subject tab; and
responsive to receiving a user request for the second back operation, executing a second back operation routine comprising:
closing the subject tab;
responsive to the subject web resource being of the hub type, closing each tab of the tab stack being stacked on the subject tab; and
activating a third tab of the tab stack other than the subject tab, the third tab being stacked under the subject tab.

3. The method of claim 1, wherein the browser window comprises a second tab stack, the second tab stack comprising a second plurality of stacked tabs, the method further comprising:
receiving a user request to move a second subject tab from the second tab stack;
responsive to receiving the user request to move the second subject tab from the second tab stack,
moving the second subject tab from the second tab stack; and
placing the second subject tab in a new tab group, the new tab group excluding the second tab stack.

4. The method of claim 3, further comprising:
moving to the new tab group, each tab of the second tab stack which was stacked one of on and above the second subject tab prior to moving the second subject tab from the second tab stack.

5. The method of claim 4, wherein:
the second tab stack from which the second subject tab is moved is an original tab stack; and
the new tab group is a new tab stack comprising the second subject tab and each tab of the original tab stack which was stacked one of on and above the second subject tab prior to moving the second subject tab from the original tab stack.

6. The method of claim 3, further comprising:
providing a move tab element associated with each tab of the second plurality of stacked tabs of the second tab stack, the move tab element being selectable by the user to request moving of the corresponding stacked tab from the second tab stack.

7. The method of claim 1 wherein:
the first web resource is a search engine results page (SERP); and
the second web resource is a search engine result included in the SERP,
the SERP being of the hub type and the search engine result being one of the hub type and the node type.

8. The method of claim 1, wherein the browser window comprises a second tab stack, the second tab stack comprising a second plurality of stacked tabs, the method further comprising:

in a second subject tab of the second tab stack associated with a second subject web resource, receiving a user request for opening a target web resource;
identifying the web resource type of the second subject web resource, the web resource type being one of the hub type and the node type;
responsive to the second subject web resource being of the node type, opening the target web resource in the second subject tab in lieu of the second subject web resource; and
responsive to the second subject web resource being of the hub type,
opening the target web resource in a target tab of the second tab stack stacked on the second subject tab.

9. The method of claim 8, further comprising, responsive to the second subject tab being a topmost tab of the second tab stack:
creating the target tab in the second tab stack of the browser window; and
stacking the target tab on the second subject tab, the second subject tab being thereby stacked under the target tab.

10. The method of claim 8, further comprising:
providing a new tab modifier element selectable by a user; and
responsive to the new tab modifier element being selected when receiving the user request for opening the target web resource, opening the target web resource in a new tab regardless of the web resource type of the second subject web resource, the new tab being in a new tab group excluding the second subject tab and the second tab stack excluding the new tab.

11. The method of claim 10, further comprising:
responsive to obtaining a new tab tag with the target web resource, opening the target web resource in a new tab regardless of the web resource type of the second subject web resource, the new tab tag being provided with the target web resource to have the target web resource be opened in the new tab, the new tab being in a new tab group excluding the second subject tab and the second tab stack excluding the new tab.

12. The method of claim 1 further comprising:
assigning the web resource type to the first web resource.

13. The method of claim 12, wherein the web resource type is assigned based at least in part on at least one of:
a general user browsing pattern for the first web resource;
a local user browsing pattern associated with the electronic device;
a pre-defined rule associated with the first web resource; and
a number of outgoing links from the first web resource.

14. An electronic device comprising:
a processor;
a user output device operatively coupled to the processor and adapted to display a browser window, the browser window comprising a tab panel, the tab panel facilitating multiple web pages being open simultaneously in the browser window and allowing a user to switch between viewing any one of the multiple web pages;
a user input device operatively coupled to the processor and adapted to receiving a user request from a user; and
a network communication interface operatively coupled to the processor and adapted for communicating with a server via a communication network,
the processor being configured to cause:
in a first tab associated with a first web resource, reception a user request for opening a second web resource;
identification whether a web resource type of the first web resource is of a hub type, the hub type corresponding to a web resource serving as a routing page for navigating to other web resources;
responsive to the web resource type of the first web resource not being of the hub type, identification of the web resource type of the first web resource type as being of a node type;
responsive to the first web resource being of the node type, opening the second web resource in the first tab in lieu of the first web resource;
responsive to the first web resource being of the hub type,
creation of a second tab;
opening the second web resource in the second tab; and
stacking the second tab on the first tab, the first tab being thereby stacked under the second tab, the first tab and the second tab being comprised in a tab stack of the browser window, the tab stack comprising a plurality of stacked tabs currently open therein; and
responsive to receiving a user request for switching from any one of the plurality of stacked tabs to a subject tab thereof in the tab stack, the switching comprising selecting the subject tab from the plurality of stacked tabs currently open in the tab stack for a presentation of a web resource associated therewith:
activation the subject tab; and
closing each tab of the plurality of stacked tabs in the tab stack being stacked on and above the subject tab having been originated therefrom without closing the subject tab; and
responsive to receiving a user request for a back operation from a subject web resource associated with the subject tab of the tab stack:
closing each tab of the tab stack being stacked one of on and above the subject tab responsive to the subject web resource being of the hub type;
accessing a browser history for the subject tab;
responsive to the browser history including a previously accessed web resource, opening the previously accessed web resource in the subject tab; and
responsive to the browser history being indicative of the subject web resource being an earliest accessed web resource, closing the subject tab.

15. The electronic device of claim 14, wherein the identification of the web resource type comprises receiving the web resource type from the server.

16. The electronic device of claim 15, wherein the server is configured to provide the web resource type based at least in part on at least one of:
a general user browsing pattern for the web resource;
a local user browsing pattern associated with the electronic device;
a pre-defined rule associated with the web resource; and
a number of outgoing links from the web resource.

17. The electronic device of claim 14, wherein the processor is further configured to cause:
provision of a first back operation element selectable by the user for requesting a first back operation; and provision of a second back operation element selectable by the user for requesting a second back operation;

responsive to receiving a user request for the first back operation, execution of a first back operation routine comprising:

responsive to the subject web resource being of the hub type, closing each tab of the tab stack being stacked on the subject tab;

accessing a browser history for the subject tab;

responsive to the browser history including a previously accessed web resource, opening the previously accessed web resource in the subject tab; and responsive to the browser history being indicative of the subject web resource being an earliest accessed web resource, closing the subject tab; and responsive to receiving a user request for the second back operation, execution of a second back operation routine comprising:

closing the subject tab;

responsive to the subject web resource being of the hub type, closing each tab of the tab stack being stacked on the subject tab; and activating a third tab of the tab stack other than the subject tab, the third tab being stacked under the subject tab.

18. The electronic device of claim 14, wherein the browser window comprises a second tab stack, the second tab stack comprising a second plurality of stacked tabs, and the processor being further configured to cause reception of a user request to move a second subject tab from the second tab stack;

responsive to receiving the user request to move the second subject tab from the second tab stack, moving the second subject tab from the second tab stack; and placement of the second subject tab in a new tab group, the new tab group excluding the second tab stack.

\* \* \* \* \*